United States Patent
Siomina et al.

(10) Patent No.: US 11,503,562 B2
(45) Date of Patent: Nov. 15, 2022

(54) MANAGING PARALLEL MEASUREMENT GAP PATTERNS FOR RADIO RESOURCE MANAGEMENT AND POSITIONING MEASUREMENTS

(71) Applicant: Telefonaktiebolaget LM Ericsson (publ), Stockholm (SE)

(72) Inventors: Iana Siomina, Täby (SE); Muhammad Kazmi, Sundbyberg (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/970,823

(22) PCT Filed: Feb. 25, 2019

(86) PCT No.: PCT/EP2019/054628
§ 371 (c)(1),
(2) Date: Aug. 18, 2020

(87) PCT Pub. No.: WO2019/162513
PCT Pub. Date: Aug. 29, 2019

(65) Prior Publication Data
US 2021/0120513 A1     Apr. 22, 2021

Related U.S. Application Data

(60) Provisional application No. 62/635,356, filed on Feb. 26, 2018.

(51) Int. Cl.
*H04W 64/00* (2009.01)
*H04W 24/10* (2009.01)

(52) U.S. Cl.
CPC .......... *H04W 64/00* (2013.01); *H04W 24/10* (2013.01)

(58) Field of Classification Search
None
See application file for complete search history.

(56) References Cited

U.S. PATENT DOCUMENTS

| 9,294,952 B2 | 3/2016 | Siomina et al. | |
| 2014/0092761 A1* | 4/2014 | Behravan | H04W 24/00 370/252 |

OTHER PUBLICATIONS

International Search Report and Written Opinion dated May 13, 2019 for International Application No. PCT/EP2019/054628 filed on Feb. 25, 2019, consisting of 11-pages.

* cited by examiner

*Primary Examiner* — Adolf Dsouza
(74) *Attorney, Agent, or Firm* — Christopher & Weisberg, P.A.

(57) ABSTRACT

A method, system and apparatus are disclosed. According to one aspect, a wireless device is configured to receive a configuration of a first measurement gap pattern and a second measurement gap pattern; and if at least one measurement gap within the first measurement gap pattern at least partially overlaps with at least one measurement gap within the second measurement gap pattern: the wireless device is configured to discard the at least one measurement gap within the first measurement gap pattern; and perform positioning measurements during at least one measurement period according to the second measurement gap pattern.

22 Claims, 13 Drawing Sheets

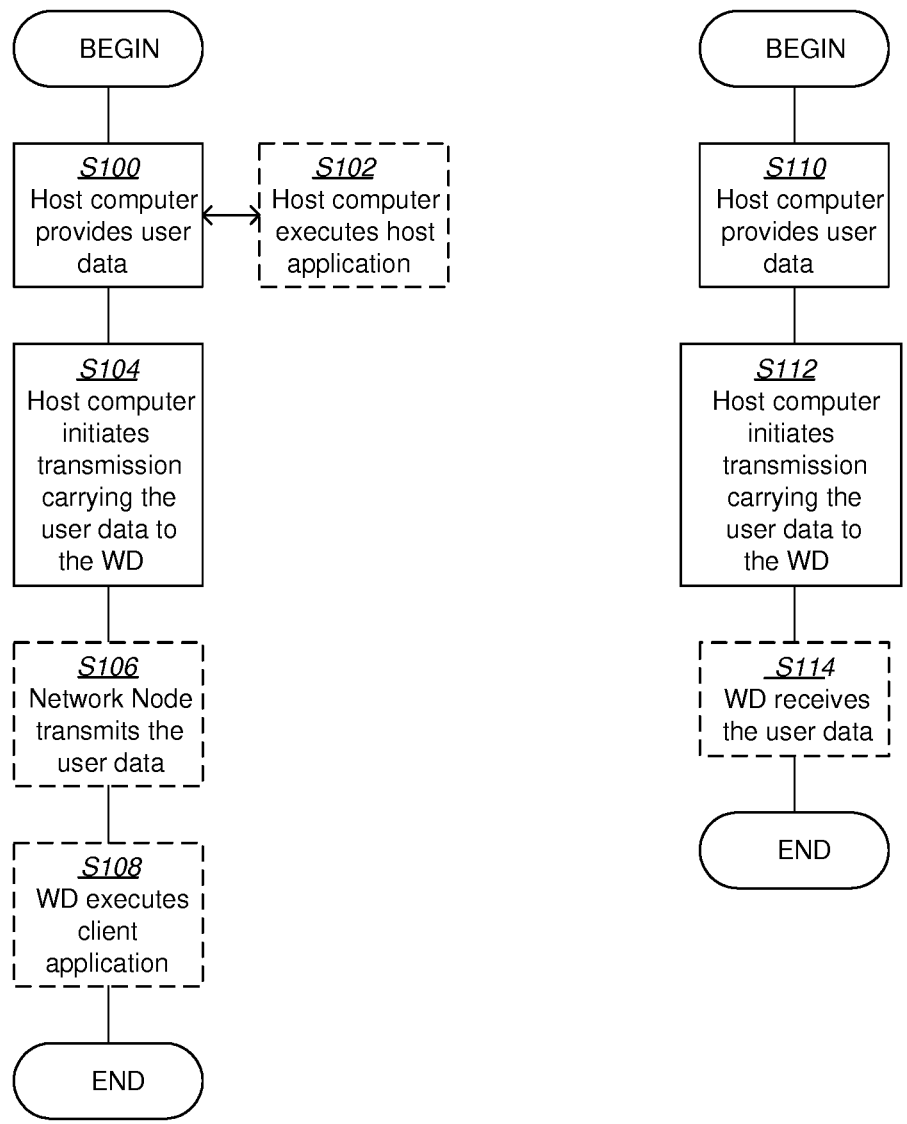

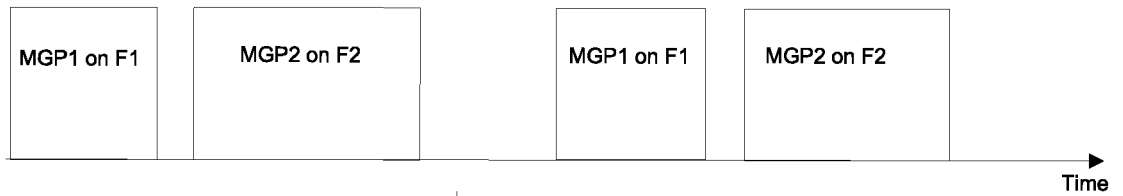
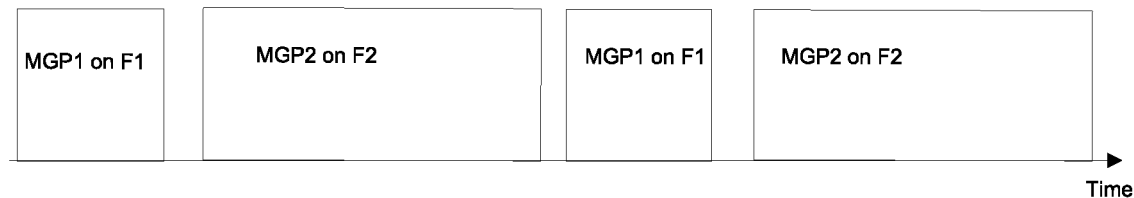
FIG. 15
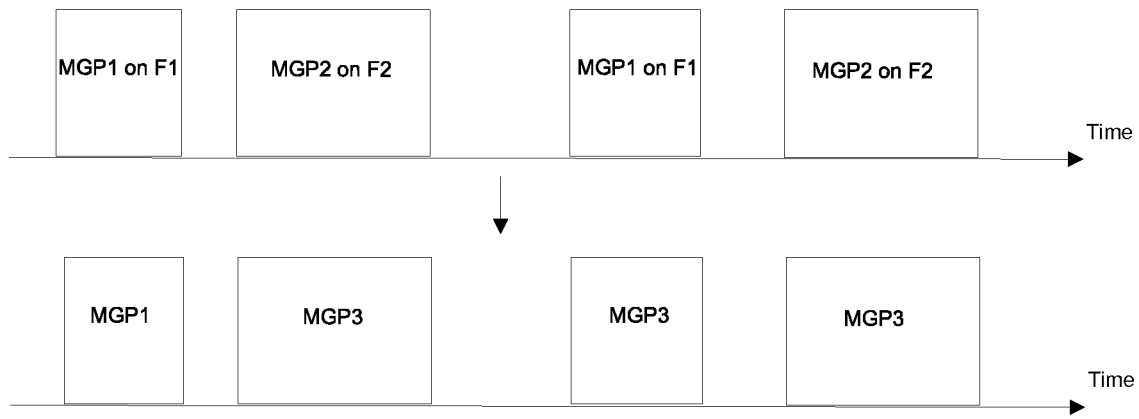
FIG. 16

MANAGING PARALLEL MEASUREMENT GAP PATTERNS FOR RADIO RESOURCE MANAGEMENT AND POSITIONING MEASUREMENTS

CROSS-REFERENCE TO RELATED APPLICATIONS

This application is a Submission Under 35 U.S.C. § 371 for U.S. National Stage Patent Application of International Application No.: PCT/EP2019/054628, filed Feb. 25, 2019 entitled "MANAGING PARALLEL MEASUREMENT GAP PATTERNS FOR RADIO RESOURCE MANAGEMENT AND POSITIONING MEASUREMENTS," which claims priority to U.S. Provisional Application No. 62/635,356, filed Feb. 26, 2018, entitled "METHODS MANAGING PARALLEL MEASUREMENT GAP PATTERNS FOR RADIO RESOURCE MANAGEMENT AND POSITIONING MEASUREMENTS," the entireties of both of which are incorporated herein by reference.

TECHNICAL FIELD

The present disclosure relates to wireless communications, and in particular, to managing parallel measurement gap patterns for radio resource management (RRM) and positioning measurements.

BACKGROUND

In Long Term Evolution (LTE), the positioning node (e.g., enhanced serving mobile location center (E-SMLC) or location server) configures the target device (e.g., wireless device (WD)), eNode B or a radio node dedicated for positioning measurements (e.g., location measurement unit (LMU)) to perform one or more positioning measurements depending upon the positioning method. The positioning measurements are used by the target device or by a measuring node or by the positioning node to determine the location of the target device. In LTE, the positioning node communicates with the WD using LTE positioning protocol (LPP) and with an eNode B using LTE positioning protocol annex (LPPa).

The LTE positioning architecture is shown in FIG. 1. The several network elements in an LTE positioning architecture are the location services (LCS) Client, the LCS target and the LCS Server. The LCS Server is a physical or logical entity managing positioning for an LCS target device by collecting measurements and other location information, assisting the WD in measurements when necessary, and estimating the LCS target location. An LCS Client is a software and/or hardware entity that interacts with an LCS Server for the purpose of obtaining location information for one or more LCS targets, i.e., the entities being positioned. LCS Clients may also reside in the LCS targets themselves. An LCS Client sends a request to the LCS Server to obtain location information, and the LCS Server processes and serves the received requests and sends the positioning result and optionally a velocity estimate to the LCS Client. A positioning request can be originated from the WD or a network node or external client.

Position calculation can be conducted, for example, by a positioning server (e.g. E-SMLC or secure user plane location platform (SLP) in LTE) or WD. The former approach corresponds to the WD-assisted positioning mode when it is based on WD measurements, while the latter corresponds to the WD-based positioning mode.

In LTE, the positioning measurements for observed time difference of arrival (OTDOA) are performed by the WD using at least position reference signals (PRS). The WD is configured with OTDOA assistance information containing PRS related information, e.g., PRS occasion length, PRS occasion periodicity, etc. The WD can further be configured with dense PRS (e.g. densePrsConfig). The dense PRS indicates that the WD (e.g., target device) supports a subset of the additional PRS configurations which comprise a PRS positioning occasion length (Nprs) with any of these values: 10 subframes, 20 subframes, 40 subframes, 80 subframes and 160 subframes (in addition to the legacy PRS occasion length of: 1, 2, 4 and 6 subframes). Nprs is the number of downlink (DL) subframes in a PRS positioning occasion. The PRS positioning occasion is transmitted with certain PRS periodicity (Tprs) e.g. 160 ms, 320 ms, 640 ms, 1280 ms.

Two measurement gap patterns have been specified in Third Generation Partnership Project (3GPP) LTE since 3GPP Rel-8 (Technical Specification (TS) 36.133), as shown in Table 1 (reproduced from TS 36.133).

TABLE 1

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 3 | 40 | $24^{NOTE\ 1,\ 2}$ | Inter-Frequency E-UTRAN FDD and TDD for cells with time difference as specified below |
| 3 | 3 | 80 | $12^{NOTE\ 1,\ 2}$ | Inter-Frequency E-UTRAN FDD and TDD for cells with time difference according as specified below. |

Traditionally, such measurement gaps have been used for inter-frequency and inter-RAT measurements.

In machine type communication (MTC) (e.g., FeMTC, eFeMTC etc), the measurement gaps are shared between intra-frequency and inter-frequency since bandwidth-limited WDs may need to retune to the central physical resource blocks (PRBs) in order to receive primary synchronization signals (PSS)/secondary synchronization signals (SSS), while it may be configured to receive data in other parts of the system bandwidth. The gap sharing between intra- and inter-frequency can be controlled by the network, and the gap sharing scheme is indicated to the WD by the radio resource control (RRC) parameter, measGapSharing-Scheme.

A WD measurement gap configuration includes the timing offset of gaps, measurement gap periodicity (or interchangeably called a measurement gap repetition period, MGRP), measurement gap length (MGL), etc. The length or size of a single measurement gap in time within a MGP is defined by the measurement gap length (MGL). During the measurement gap (i.e., over MGL) the WD may not be required to transmit or receive any signal between the WD and one or more serving cells.

The 'dense PRS' (e.g., up to 160 PRS subframes in a single PRS positioning occasion as configured via LTE positioning protocol (LPP) by add-numDL-Frames-r14) have been introduced for FeMTC and narrow band Internet of things (NB-IoT) enhancement since 3GPP Rel-14. To enable the WD to better exploit the dense PRS, new measurement gap patterns (with longer MGL and possibly different MGRP) are to be introduced for reference signal time difference (RSTD) measurements. The existing gaps (with MGL of 6 ms) may not be suitable for carrying out the RSTD measurements since the PRS occasion length can be much longer than 4 ms which is the effective subframe duration with current MGL. Examples of PRS occasions lengths which are not suitable to use with current measurement gaps are all above 4, i.e., any number between 5 and 160, which are quite many configuration options. Furthermore, longer MGL may require a different MGRP, e.g., longer MGRP.

The new measurement gaps which are to be developed for dense PRS may not be necessarily suitable for RRM measurements. Furthermore, measurement gaps with long MGL may have a significant unforeseen impact on the serving cell performance, e.g., radio link monitoring (RLM), scheduling, delayed uplink (UL) transmissions, delayed feedbacks, etc., so the measurement gaps with long MGL may not be used when there is no need in RSTD measurements based on new dense PRS. It is also not clear how the WD may perform RRM/RLM measurements when configured with the new measurement gaps for positioning measurements and which requirements may be met.

In existing solutions (e.g., in Universal Mobile Telecommunication System (UMTS)), multiple gap patterns are configured in parallel for the same WD, e.g., for doing different types of measurements (e.g., inter-radio access technology (RAT) Global System for Mobile Communications (GSM) measurements, Universal Terrestrial Radio Access (UTRA) inter-frequency measurements, etc.). However, in this case, measurements and the gaps used for these measurements across different parallel measurement gap patterns do not overlap in time. MGL for dense PRS configurations can be very large, e.g., 40 subframes. Therefore, it may be impossible to avoid any overlap in time between gaps used for measurement using a dense PRS configuration and gaps used for other measurements (e.g., for RRM). This may severely degrade the performance of both positioning measurements and other measurements. In some cases, both positioning and/or mobility (e.g., handover) may fail.

SUMMARY

Some embodiments advantageously provide methods, systems, and apparatuses providing means for using legacy measurement gap patterns and a new measurement gap pattern for positioning measurements in parallel over at least partially overlapping time.

The legacy measurement gap pattern referred to herein as a first measurement gap pattern (MGP1) with a first measurement gap length (MGL1) can be configured for doing first measurements (M1) (e.g., mobility measurements) on a first type of signals (e.g., discovery signals (DRS1) which may include, e.g., cell-specific reference signals (CRS) or other reference signals). A second measurement gap pattern (MGP2) with a second measurement gap length (MGL2) can be configured for performing second measurements (M2) on a second type of signals (e.g., discovery signals, DRS2, used for doing positioning measurement such as RSTD on dense PRS configuration). MGP1 and MGP2 are used in parallel where the measurement gaps of MGP1 and MGP2 at least partially overlap in time and where MGL2>MGL1 (e.g., MGL2=40 ms and MGL1=6 ms). Some embodiments define rules according to which the WD is allowed to at least partially discard (e.g., partially or fully discard) one or more measurement gaps (within a measurement gap pattern) for doing one or more measurements for which that measurement gap pattern is configured. The rules may be based on one or more criteria or scenarios, e.g., coverage enhancement (CE) level of a reference cell (e.g., serving cell), relation between the MGLs of the two MGPs (e.g., difference between MGL1, MGL2, amount of overlap between the gaps in time, etc.). The rules may further enable the WD to adapt one or more measurement requirements (e.g., measurement time, reporting delay, and/or measurement accuracy of M1 and/or M2) for M1 and/or M2 measurements depending on one or more criteria (e.g., CE level, etc.).

Some embodiments provide for the advantage of non-ambiguous behavior, in the WD, when WDs are configured with the new measurement gaps for positioning measurements while being configured with legacy measurement gaps for RRM measurements. Some methods disclosed herein advantageously allow the WD to carry out both RRM measurements and positioning measurements in a timely manner and meet a pre-defined set of the requirements, even when the WD is configured with two types of measurement gaps. Thus, the measurement gaps may advantageously be used more efficiently and further, while performing positioning measurements using dense gaps, the mobility performance which relies on mobility measurements may not be adversely affected.

According to one aspect, a network node is configured to determine a measurement period of at least first measurements based on a first measurement gap configuration, and perform at least one operational task based on the first measurement gap configuration. According to another aspect, a wireless device is configured to receive from the network node first and second measurement gap patterns, and perform measurements according to the first and second measurement gap patterns.

According to one aspect, a wireless device, WD, configured to communicate with a network node is provided. The WD comprises processing circuitry configured to: receive a configuration of a first measurement gap pattern and a second measurement gap pattern; and if at least one measurement gap within the first measurement gap pattern at least partially overlaps with at least one measurement gap within the second measurement gap pattern: discard the at least one measurement gap within the first measurement gap pattern; and perform positioning measurements during at least one measurement period according to the second measurement gap pattern.

In some embodiments of this aspect, the processing circuitry is configured to perform the positioning measurements by being configured to: perform reference signal time difference, RSTD, measurements during the at least one measurement period according to the second measurement gap pattern. In some embodiments of this aspect, the processing circuitry is configured to perform the positioning measurements by being configured to: perform the positioning measurements based on dense position reference signaling, PRS during the at least one measurement period according to the second measurement gap pattern. In some embodiments of this aspect, the processing circuitry is further configured to: adapt a measurement requirement associated with the second measurement gap pattern based on a relation between at least one parameter of the second measurement gap pattern and at least one parameter of the first measurement gap pattern. In some embodiments of this aspect, the second measurement gap pattern is different from the first measurement gap pattern. In some embodiments of this aspect, the second measurement gap pattern is configured to support the positioning measurements and the first measurement gap pattern is configured to support mobility measurements.

In some embodiments of this aspect, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements. In some embodiments of this aspect, the processing circuitry is further configured to discard the at least one measurement gap within the first measurement gap pattern by being configured to: leave unused at least an amount of the at least one measurement gap for performing measurements for which the first measurement gap pattern is configured. In some embodiments of this aspect, the at least one measurement gap within the second measurement gap pattern is larger than the at least one measurement gap within the first measurement gap pattern. In some embodiments of this aspect, the processing circuitry is further configured to: receive the configuration of the second measurement gap pattern as a result of a request from the WD to perform reference signal time difference, RSTD, measurements.

In some embodiments of this aspect, the processing circuitry is further configured to perform the positioning measurements during the at least one measurement period according to the second measurement gap pattern by being configured to: adapt a duration of the at least one measurement gap within the second measurement gap pattern based on a coverage enhancement, CE, level of the WD; and perform the positioning measurements according to the adapted duration. In some embodiments of this aspect, the processing circuitry is further configured to perform the positioning measurements during the at least one measurement period according to the second measurement gap pattern by being configured to: adapt a duration of the at least one measurement gap within the second measurement gap pattern based on at least one of: an amount of overlap between the at least one measurement gap within the first measurement gap pattern and the at least one measurement gap within the second measurement gap pattern; a speed of the WD; a coverage enhancement level of a reference cell; a characteristic of reference signals used for measurements using the first measurement gap pattern and the second measurement gap pattern; and an indication from the network node; and perform the positioning measurements according to the adapted duration.

According to another aspect, a method for a wireless device, WD, is provided. The method comprises: receiving a configuration of a first measurement gap pattern and a second measurement gap pattern; and if at least one measurement gap within the first measurement gap pattern at least partially overlaps with at least one measurement gap within the second measurement gap pattern: discarding the at least one measurement gap within the first measurement gap pattern; and performing positioning measurements during at least one measurement period according to the second measurement gap pattern.

In some embodiments of this aspect, the performing the positioning measurements further comprises: performing reference signal time difference, RSTD, measurements during the at least one measurement period according to the second measurement gap pattern. In some embodiments of this aspect, the performing the positioning measurements further comprises: performing the positioning measurements based on dense position reference signaling, PRS during the at least one measurement period according to the second measurement gap pattern. In some embodiments of this aspect, the method further comprises adapting a measurement requirement associated with the second measurement gap pattern based on a relation between at least one parameter of the second measurement gap pattern and at least one parameter of the first measurement gap pattern. In some embodiments of this aspect, the second measurement gap pattern is different from the first measurement gap pattern. In some embodiments of this aspect, the second measurement gap pattern is configured to support the positioning measurements and the first measurement gap pattern is configured to support mobility measurements.

In some embodiments of this aspect, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements. In some embodiments of this aspect, the discarding the at least one measurement gap within the first measurement gap pattern further comprises: leaving unused at least an amount of the at least one measurement gap for performing measurements for which the first measurement gap pattern is configured. In some embodiments of this aspect, the at least one measurement gap within the second measurement gap pattern is larger than the at least one measurement gap within the first measurement gap pattern. In some embodiments of this aspect, the receiving the configuration further comprises: receiving the configuration of the second measurement gap pattern as a result of a request from the WD to perform reference signal time difference, RSTD, measurements.

In some embodiments of this aspect, the performing the positioning measurements during the at least one measurement period according to the second measurement gap pattern further comprises: adapting a duration of the at least one measurement gap within the second measurement gap pattern based on a coverage enhancement, CE, level of the WD; and performing the positioning measurements according to the adapted duration. In some embodiments of this aspect, the performing the positioning measurements during the at least one measurement period according to the second measurement gap pattern further comprises: adapting a duration of the at least one measurement gap within the second measurement gap pattern based on at least one of: an amount of overlap between the at least one measurement gap within the first measurement gap pattern and the at least one measurement gap within the second measurement gap pattern; a speed of the WD; a coverage enhancement level of a reference cell; a characteristic of reference signals used for measurements using the first measurement gap pattern and the second measurement gap pattern; and an indication from a network node; and performing the positioning measurements according to the adapted duration.

According to yet another aspect of the present disclosure, a network node configured to communicate with a wireless device, WD, is provided. The network node comprises processing circuitry configured to: configure the WD with a first measurement gap pattern and a second measurement gap pattern; and receive an indication of a positioning measurement from the WD, the positioning measurement configured to be performed during at least one measurement period according to the second measurement gap pattern, while discarding at least one measurement gap within the first measurement gap pattern if the at least one measurement gap within the first measurement gap pattern at least partially overlaps with at least one measurement gap within the second measurement gap pattern.

In some embodiments of this aspect, the positioning measurement is a reference signal time difference, RSTD, measurement. In some embodiments of this aspect, the positioning measurement is a positioning measurement based on dense position reference signaling, PRS. In some embodiments of this aspect, the second measurement gap pattern is configured to support the positioning measurements and the first measurement gap pattern is configured to support mobility measurements. In some embodiments of this aspect, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements.

In some embodiments of this aspect, the processing circuitry is further configured to: receive a request from the WD to perform reference signal time difference, RSTD, measurements; and configure the WD with the second measurement gap pattern as a result of the request. In some embodiments of this aspect, the processing circuitry is further configured to: if a positioning measurement is not received during the at least one measurement period, send a configuration message to the WD, the configuration message re-configuring the WD with the second measurement gap pattern. In some embodiments of this aspect, the processing circuitry is further configured to: as a result of receiving the indication of the positioning measurement from the WD, send a de-configuration message to the WD, the de-configuration message instructing the WD to stop using the second measurement gap pattern.

According to yet another aspect of the present disclosure, a method for a network node configured to communicate with a wireless device, WD, is provided. The method comprises configuring the WD with a first measurement gap pattern and a second measurement gap pattern; and receiving an indication of a positioning measurement from the WD, the positioning measurement configured to be performed during at least one measurement period according to the second measurement gap pattern, while discarding at least one measurement gap within the first measurement gap pattern if the at least one measurement gap within the first measurement gap pattern at least partially overlaps with at least one measurement gap within the second measurement gap pattern.

In some embodiments of this aspect, the positioning measurement is a reference signal time difference, RSTD, measurement. In some embodiments of this aspect, the positioning measurement is a positioning measurement based on dense position reference signaling, PRS. In some embodiments of this aspect, the second measurement gap pattern is configured to support the positioning measurements and the first measurement gap pattern is configured to support mobility measurements. In some embodiments of this aspect, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements.

In some embodiments of this aspect, the method further comprises receiving a request from the WD to perform reference signal time difference, RSTD, measurements; and configuring the WD with the second measurement gap pattern as a result of the request. In some embodiments of this aspect, the method further comprises, if a positioning measurement is not received during the at least one measurement period, sending a configuration message to the WD, the configuration message re-configuring the WD with the second measurement gap pattern. In some embodiments of this aspect, the method further comprises, as a result of receiving the indication of the positioning measurement from the WD, sending a de-configuration message to the WD, the de-configuration message instructing the WD to stop using the second measurement gap pattern.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for executing a client application at a wireless device according to some embodiments of the present disclosure;

FIG. 8 is a flowchart illustrating exemplary methods implemented in a communication system including a host computer, a network node and a wireless device for receiving user data at a wireless device according to some embodiments of the present disclosure;

FIG. 15 is a diagram of another measurement scenario;

FIG. 16 is a diagram of yet another measurement scenario;

DETAILED DESCRIPTION

Figure 1:
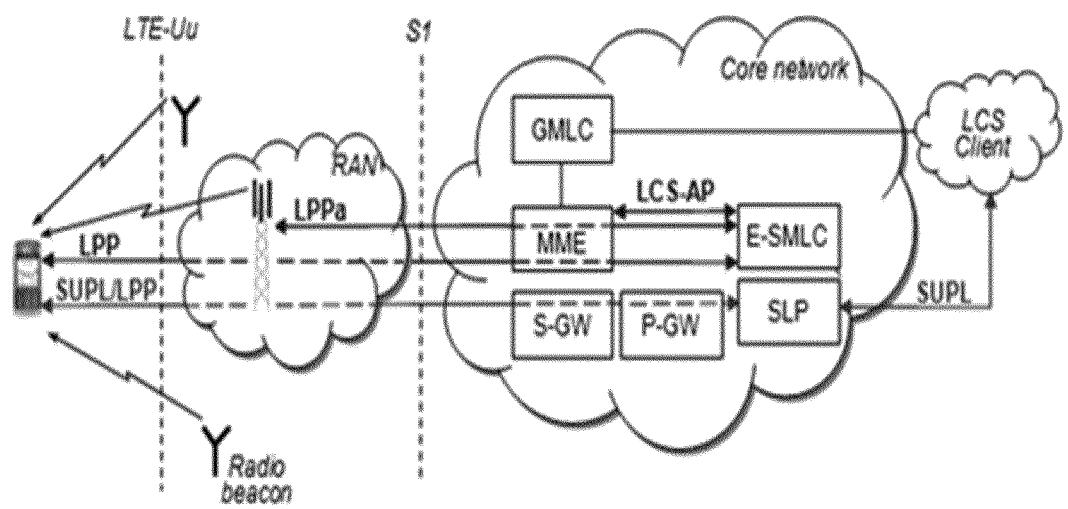
FIG. 1 is a diagram of LTE positioning architecture.

Before describing in detail exemplary embodiments, it is noted that the embodiments reside primarily in combinations of apparatus components and processing steps related to managing parallel measurement gap patterns for radio resource management (RRM) and positioning measurements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (WD) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. Other examples of a wireless device include target device, device to device (D2D) WD, machine type WD or WD capable of machine to machine (M2M) communication, PDA, PAD, Tablet, mobile terminals, smart phone, laptop embedded equipped (LEE), laptop mounted equipment (LME), USB dongles, ProSe, vehicle to vehicle (V2V) WD, vehicle and anything WD, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term "radio measurement" (a.k.a. measurements) used herein may refer to any measurement performed on reference signals (RS). Examples of RS are discovery reference signals (DRS). Examples of DRS are PRS, CRS, channel state information reference signals (CSI-RS), PSS, SSS, narrow band reference signal (NRS), narrow band SSS, narrow band PSS, etc. In another example, DRS can be any periodic signal with a configurable or pre-defined periodicity or signals based on a time-domain pattern. In another more narrow and specific example, DRS signals are as specified in 3GPP 36.211. Radio measurements can be absolute or relative. Radio measurements can be, for example, intra-frequency, inter-frequency, carrier aggregation (CA), etc. Radio measurements can be unidirectional (e.g., DL or UL) or bidirectional (e.g., round trip time (RTT), receive-transmit (Rx-Tx), etc.). Some examples of radio measurements: timing measurements (e.g., time of arrival (TOA), timing advance, round trip time (RTT), RSTD, SSTD, Rx-Tx, propagation delay, etc.), angle measurements (e.g., angle of arrival), power-based measurements (e.g., received signal power, RSRP, received signal quality, RSRQ, signal to interference plus noise ratio (SINR), signal to noise ratio (SNR), interference power, total interference plus noise, received signal strength indicator (RSSI), noise power, channel quality indicator (CQI), CSI, precoding matrix indicator (PMI), etc.), cell detection or cell identification, beam detection or beam identification, RLM, system information reading, etc.

The term time resource used herein may correspond to any type of physical resource or radio resource expressed in terms of length of time. Examples of time resources are: symbol, mini-slot, time slot, subframe, radio frame, transmission time interval (TTI), interleaving time, etc.

The term TTI used herein may correspond to any time period over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF), mini-subframe etc.

The embodiments described herein may apply to any radio resource control (RRC) state, e.g., RRC_CONNECTED or RRC_IDLE or INACTIVE.

The embodiments described herein are not limited to MTC WDs and its evolutions, but can apply for any WD supporting short measurements gaps and measurement gaps for dense PRS or other dense signals for a specific type of radio measurements (e.g., positioning measurements).

The embodiments are described for LTE. However, the embodiments are applicable to any RAT or multi-RAT systems, where the WD receives and/or transmit signals (e.g. data) e.g. LTE frequency division duplex (FDD)/time division duplex (TDD), wideband CDMA (WCDMA)/high speed packet access (HSPA), GSM/GERAN, Wi-Fi, WLAN, CDMA2000, 5G, NR (standalone or non-standalone), etc.

Figure 13:
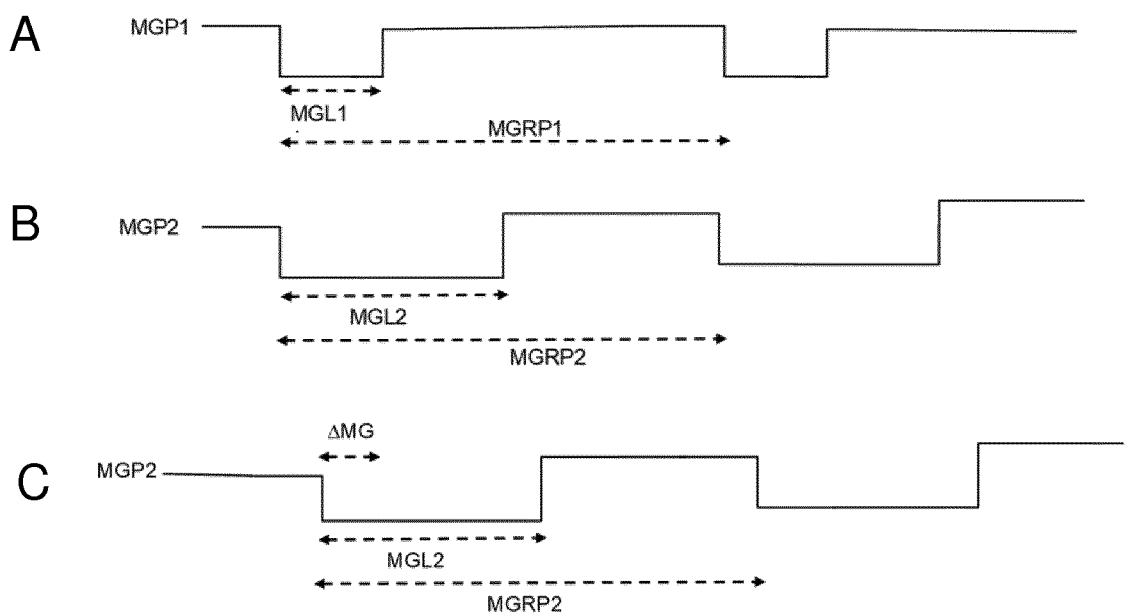
FIG. 13 is a set of graphs showing relationships between measurement gap lengths.

In some embodiments, the phrase "at least partially overlapping in time" is intended broadly to encompass, for example, a first measurement gap and a second measurement gap occurring at the same time or the same time resources, as well as, all or a subset of a time period for one measurement gap occurring at the same time as all or a subset of a time period for another measurement gap (see e.g., FIG. 13).

In some embodiments, the term "discard" is used and may be intended to indicate e.g., the WD not using or leaving unused at least an amount of one or more measurement gaps for performing measurements for which the measurement gap pattern is configured, or suspending use of the measurement gap pattern for performing measurements during the one or more measurement gaps defined by the measurement gap pattern.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present disclosure provide for using legacy measurement gap patterns and a new measurement gap pattern for positioning measurements in parallel over at least partially overlapping time. In some embodiments, a WD may be configured with a first measurement gap pattern (MGP1) and a second measurement gap pattern (MGP2) (e.g., the pattern defined for dense PRS) in parallel at the same time or at least partially overlapping in time. The MGP1 is characterized by or defined by one or more first measurement gaps (MG1) with a first measurement gap length (MGL1), a first measurement gap offset (GO1) and a first measurement gap repetition period (MGRP1). The MGP2 is characterized by or defined by one or more second measurement gaps (MG2) with a second measurement gap length (MGL2), a second measurement gap offset (GO2) and a second measurement gap repetition period (MGRP2).

Figure 2:
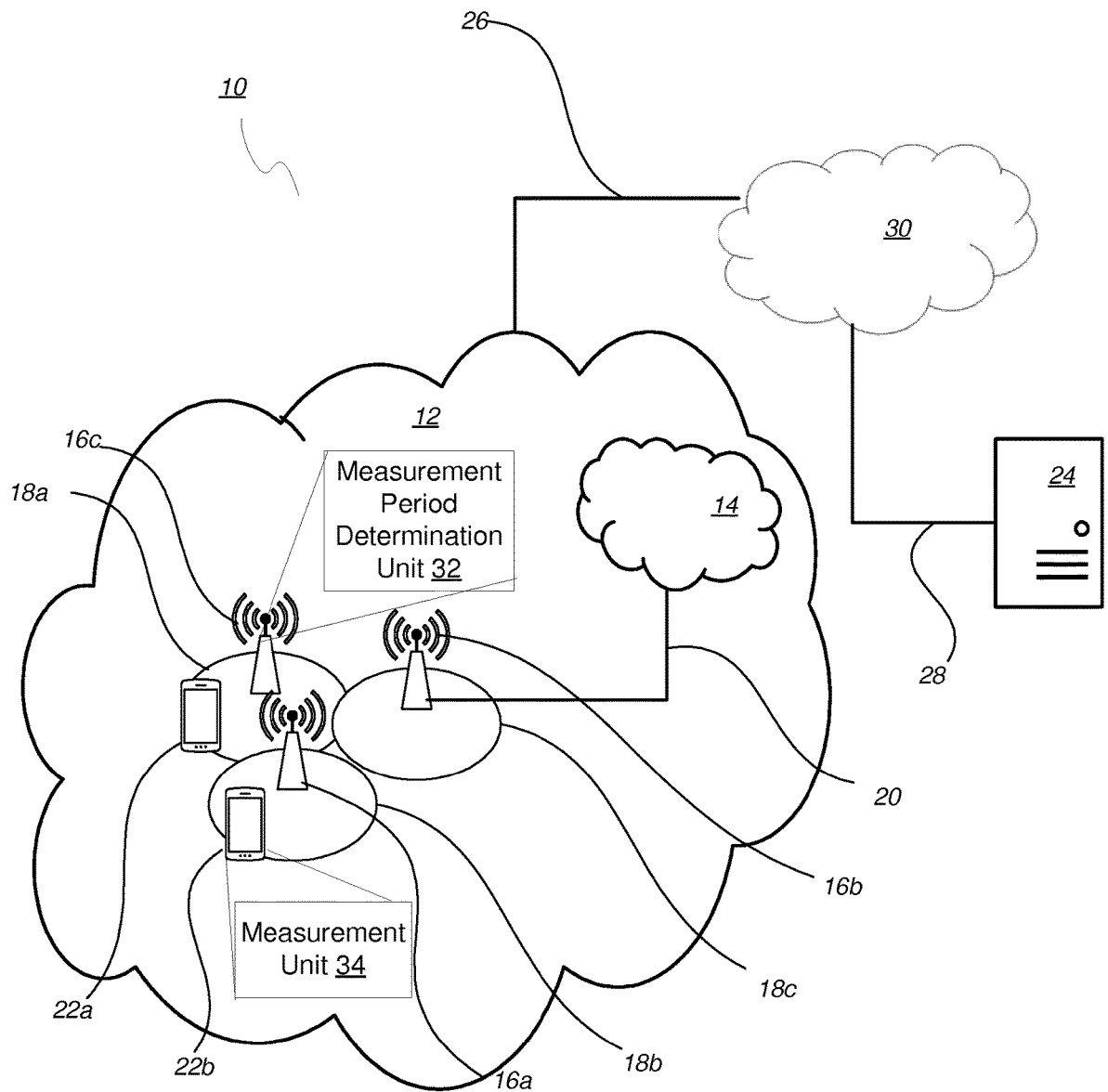
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2 a schematic diagram of a communication system, according to an embodiment, including a communication system 10, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WS 22 can be in communication with an eNB—for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a measurement period determination unit 32 configured to configure the WD 22 with a first measurement gap pattern and a second measurement gap pattern; and receive an indication of a positioning measurement from the WD 22, the positioning measurement configured to be performed during at least one measurement period according to the second measurement gap pattern, while discarding at least one measurement gap within the first measurement gap pattern if the at least one measurement gap within the first measurement gap pattern at least partially overlaps with at least one measurement gap within the second measurement gap pattern. In an alternate embodiment, network node 16 is configured to include a measurement period determination unit 32 configured to determine a measurement period of at least first measurements based on a first measurement gap configuration.

A wireless device 22 is configured to include a measurement unit 34 configured to receive a configuration of a first measurement gap pattern and a second measurement gap pattern; and if at least one measurement gap within the first measurement gap pattern at least partially overlaps with at least one measurement gap within the second measurement gap pattern: discard the at least one measurement gap within the first measurement gap pattern; and perform positioning measurements during at least one measurement period according to the second measurement gap pattern. In an alternate embodiment, wireless device 22 is configured to include a measurement unit 34 configured to perform measurements according to first and second measurement gap patterns received from a network node 16.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor such, as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor such, as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include measurement period determination unit 32 configured to configure the WD 22 with a first measurement gap pattern and a second measurement gap pattern; and receive an indication of a positioning measurement from the WD 22, the positioning measurement configured to be performed during at least one measurement period according to the second measurement gap pattern, while discarding at least one measurement gap within the first measurement gap pattern if the at least one measurement gap within the first measurement gap pattern at least partially overlaps with at least one measurement gap within the second measurement gap pattern.

In some embodiments, the positioning measurement is a reference signal time difference, RSTD, measurement. In some embodiments, the positioning measurement is a positioning measurement based on dense position reference signaling, PRS. In some embodiments, the second measurement gap pattern is configured to support the positioning measurements and the first measurement gap pattern is configured to support mobility measurements. In some embodiments, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements. In some embodiments, the processing circuitry 68 is further configured to: receive a request from the WD 22 to perform reference signal time difference, RSTD, measurements; and configure the WD 22 with the second measurement gap pattern as a result of the request.

In some embodiments, the processing circuitry 68 is further configured to: if a positioning measurement is not received during the at least one measurement period, send a configuration message to the WD, the configuration message re-configuring the WD with the second measurement gap pattern. In some embodiments, the processing circuitry 68 is further configured to: as a result of receiving the indication of the positioning measurement from the WD 22, send a de-configuration message to the WD 22, the de-configuration message instructing the WD 22 to stop using the second measurement gap pattern.

In another embodiment, the network node 16 may include measurement period determination unit 32 configured to determine a measurement period of at least first measurements based on a first measurement gap configuration.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor such, as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a measurement unit 34 configured to receive a configuration of a first measurement gap pattern and a second measurement gap pattern; and if at least one measurement gap within the first measurement gap pattern at least partially overlaps with at least one measurement gap within the second measurement gap pattern: discard the at least one measurement gap within the first measurement gap pattern; and perform positioning measurements during at least one measurement period according to the second measurement gap pattern.

In some embodiments, the processing circuitry 84 is configured to perform the positioning measurements by being configured to: perform reference signal time difference, RSTD, measurements during the at least one measurement period according to the second measurement gap pattern. In some embodiments, the processing circuitry 84 is configured to perform the positioning measurements by being configured to: perform the positioning measurements based on dense position reference signaling, PRS during the at least one measurement period according to the second measurement gap pattern. In some embodiments, the processing circuitry 84 is further configured to: adapt a measurement requirement associated with the second measurement gap pattern based on a relation between at least one parameter of the second measurement gap pattern and at least one parameter of the first measurement gap pattern. In some embodiments, the second measurement gap pattern is different from the first measurement gap pattern.

In some embodiments, the second measurement gap pattern is configured to support the positioning measurements and the first measurement gap pattern is configured to support mobility measurements. In some embodiments, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements. In some embodiments, the processing circuitry 84 is further configured to discard the at least one measurement gap within the first measurement gap pattern by being configured to: leave unused at least an amount of the at least one measurement gap for performing measurements for which the first measurement gap pattern is configured. In some embodiments, the at least one measurement gap within the second measurement gap pattern is larger than the at least one measurement gap within the first measurement gap pattern.

In some embodiments, the processing circuitry 84 is further configured to: receive the configuration of the second measurement gap pattern as a result of a request from the WD 22 to perform reference signal time difference, RSTD, measurements. In some embodiments, the processing circuitry 84 is further configured to perform the positioning measurements during the at least one measurement period according to the second measurement gap pattern by being configured to: adapt a duration of the at least one measurement gap within the second measurement gap pattern based on a coverage enhancement, CE, level of the WD 22; and perform the positioning measurements according to the adapted duration.

In some embodiments, the processing circuitry 84 is further configured to perform the positioning measurements during the at least one measurement period according to the second measurement gap pattern by being configured to: adapt a duration of the at least one measurement gap within the second measurement gap pattern based on at least one of: an amount of overlap between the at least one measurement gap within the first measurement gap pattern and the at least one measurement gap within the second measurement gap pattern; a speed of the WD 22; a coverage enhancement level of a reference cell; a characteristic of reference signals used for measurements using the first measurement gap pattern and the second measurement gap pattern; and an indication from the network node 16; and perform the positioning measurements according to the adapted duration.

In another embodiment, the processing circuitry 84 of the wireless device 22 may include a measurement unit 34 configured to perform measurements according to first and second measurement gap patterns received from a network node 16.

Figure 3:
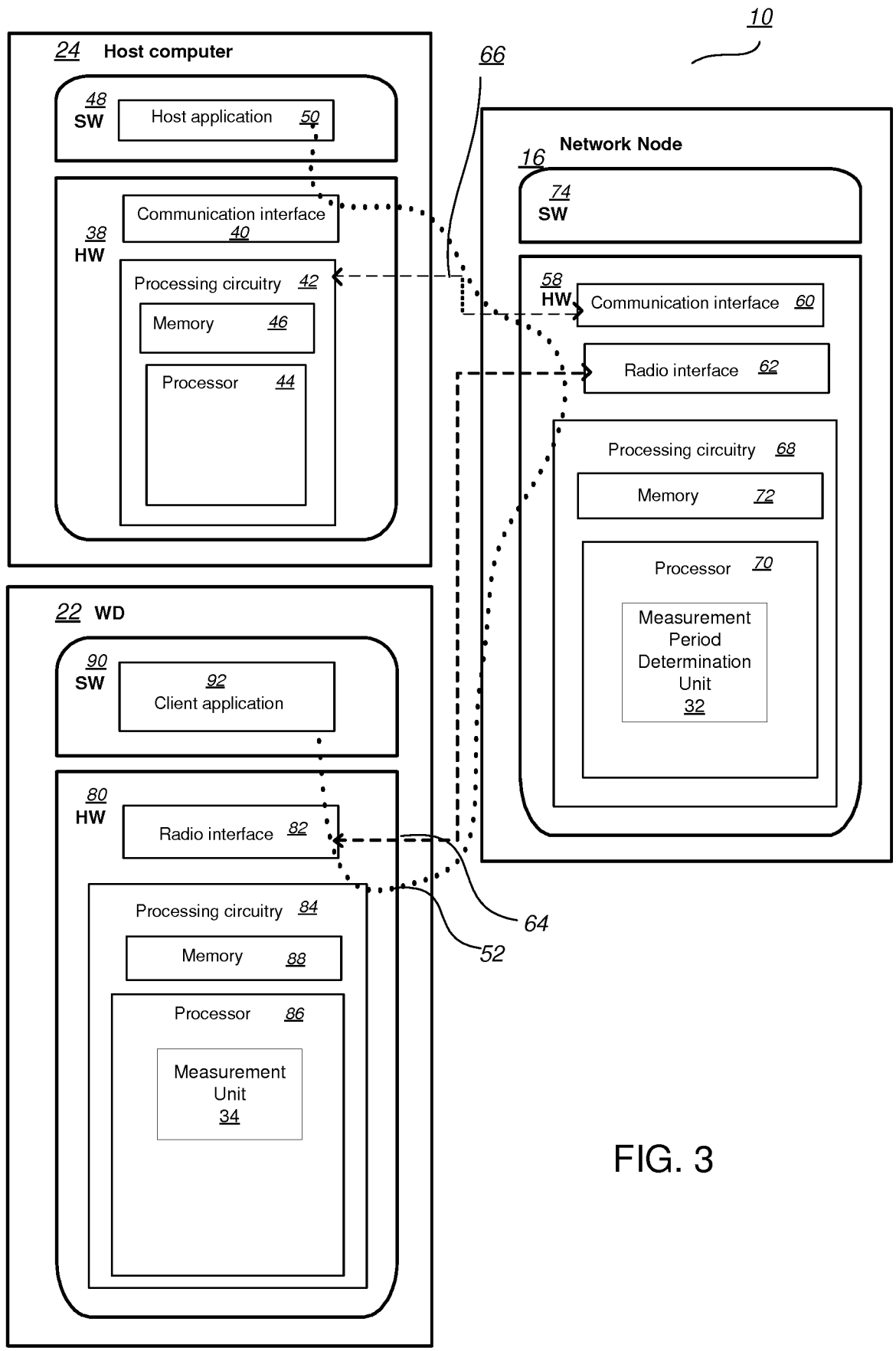
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as measurement period determination unit 32, and measurement unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
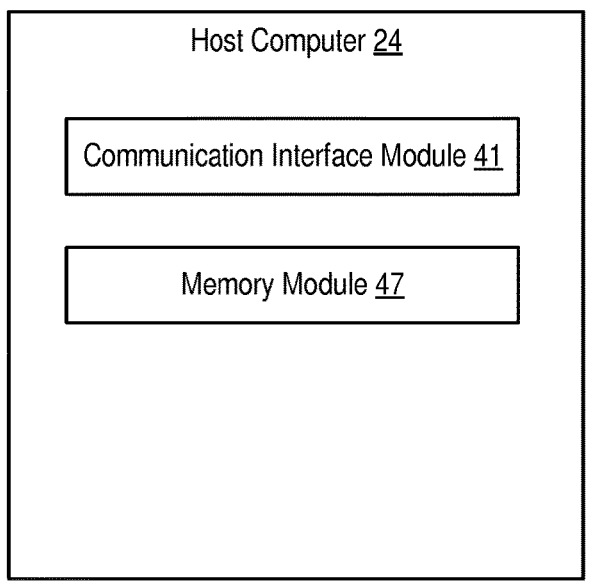
FIG. 4 is a block diagram of an alternative embodiment of a host computer according to some embodiments of the present disclosure.

FIG. 4 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 5:
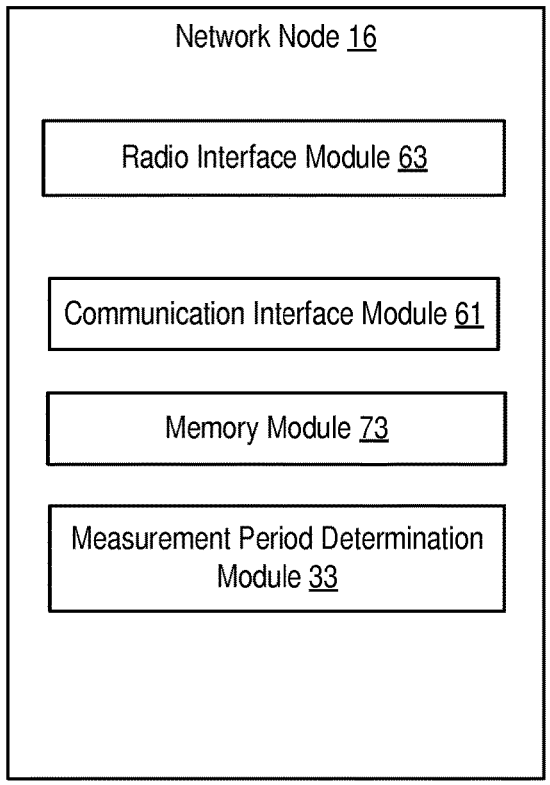
FIG. 5 is a block diagram of an alternative embodiment of a network node according to some embodiments of the present disclosure.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The measurement period determination module 33 is configured to determine a measurement period of at least first measurements based on a first measurement gap configuration.

Figure 6:
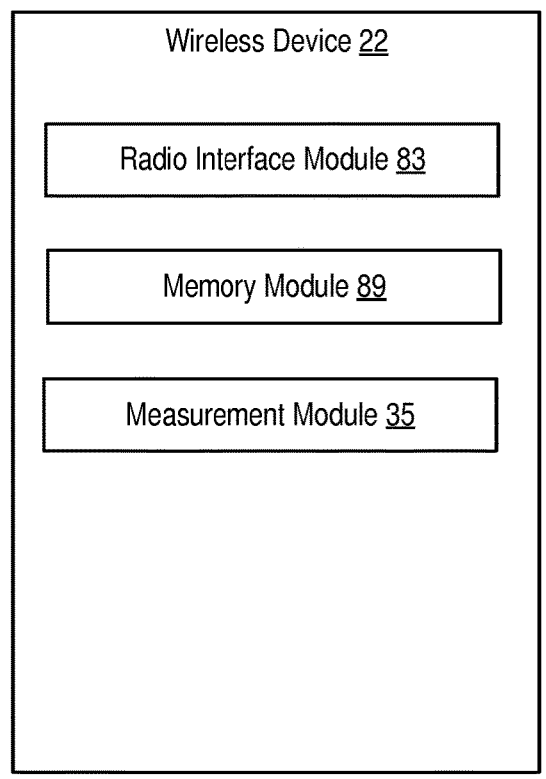
FIG. 6 is a block diagram of an alternative embodiment of a wireless device according to some embodiments of the present disclosure.

FIG. 6 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The measurement module 35 is configured to include a measurement unit 34 configured to perform measurements according to first and second measurement gap patterns received from a network node.

FIG. 7 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 8 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 9, 10:
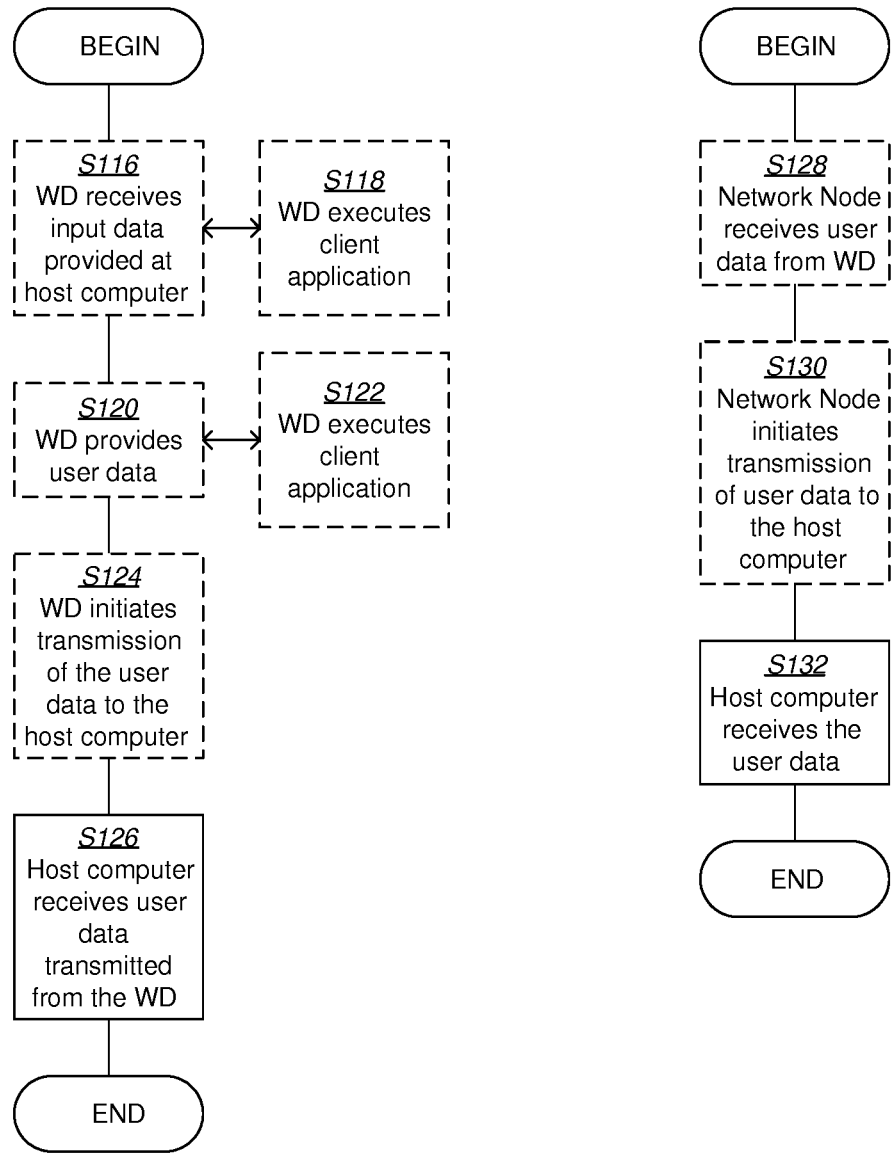
FIG. 9 is a flowchart illustrating exemplary methods implemented in a communication system including a host computer, a network node and a wireless device for receiving user data from the wireless device at a host computer according to some embodiments of the present disclosure.
FIG. 10 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
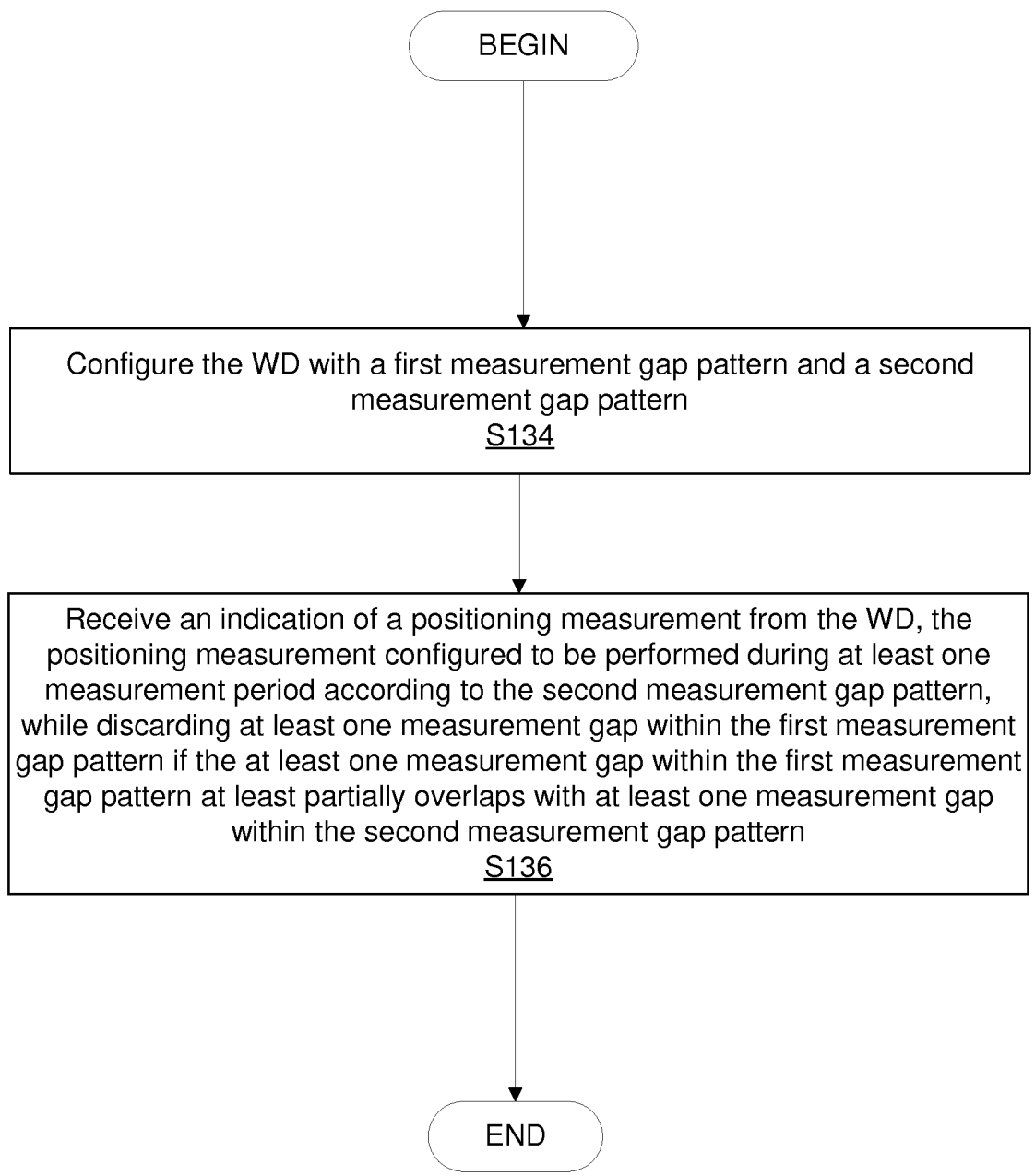
FIG. 11 is a flowchart of an exemplary process in a network node according to some embodiments of the present disclosure.

FIG. 11 is a flowchart of an exemplary process in a network node 16 according to some embodiments of the present disclosure. One or more Blocks and/or functions and/or methods performed by the network node 16 may be performed by one or more elements of network node 16 such as by measurement period determination unit 32 in processing circuitry 68, processor 70, radio interface 62, etc. according to the example method. The example method includes configuring (Block S134), such as via the measurement period determination unit 32 in processing circuitry 68 and/or the radio interface 62, the WD 22 with a first measurement gap pattern and a second measurement gap pattern; and receiving (Block S136), such as via the measurement period determination unit 32 in processing circuitry 68 and/or the radio interface 62, an indication of a positioning measurement from the WD 22, the positioning measurement configured to be performed during at least one measurement period according to the second measurement gap pattern, while discarding at least one measurement gap within the first measurement gap pattern if the at least one measurement gap within the first measurement gap pattern at least partially overlaps with at least one measurement gap within the second measurement gap pattern.

In some embodiments, the positioning measurement is a reference signal time difference, RSTD, measurement. In some embodiments, the positioning measurement is a positioning measurement based on dense position reference signaling, PRS. In some embodiments, the second measurement gap pattern is configured to support the positioning measurements and the first measurement gap pattern is configured to support mobility measurements. In some embodiments, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements. In some embodiments, the method further comprising receiving, such as via the measurement period determination unit 32 in processing circuitry 68 and/or the radio interface 62, a request from the WD 22 to perform reference signal time difference, RSTD, measurements; and configuring, such as via the measurement period determination unit 32 in processing circuitry 68 and/or the radio interface 62, the WD 22 with the second measurement gap pattern as a result of the request.

In some embodiments, the method further comprises, if a positioning measurement is not received during the at least one measurement period, sending, such as via radio interface 62, a configuration message to the WD 22, the configuration message re-configuring the WD 22 with the second measurement gap pattern. In some embodiments, the method further comprises, as a result of receiving the indication of the positioning measurement from the WD 22, sending, such as via the measurement period determination unit 32 in processing circuitry 68 and/or the radio interface 62, a de-configuration message to the WD 22, the de-configuration message instructing the WD 22 to stop using the second measurement gap pattern.

In another embodiment, the process includes determining, via the measurement period determination unit 32, a measurement period of at least first measurements based on a first measurement gap configuration. The process also includes performing, via the processor 70, at least one operational task based on the first measurement gap configuration.

Figure 12:
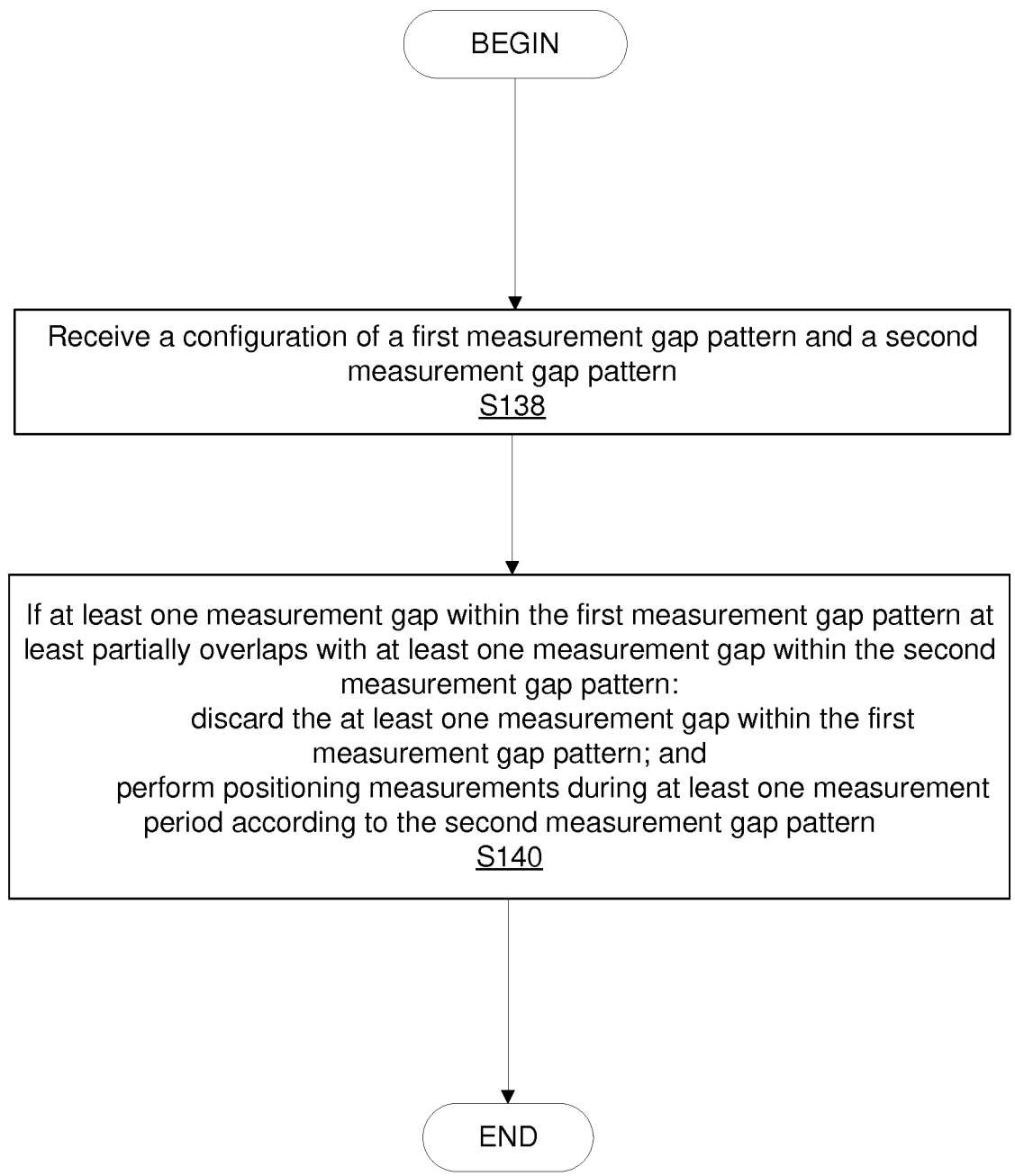
FIG. 12 is a flowchart of an exemplary process in a wireless device according to some embodiments of the present disclosure.

FIG. 12 is a flowchart of an exemplary process in a wireless device 22 according to some embodiments of the present disclosure. One or more Blocks and/or functions and/or methods performed by WD 22 may be performed by one or more elements of WD 22 such as by measurement unit 34 in processing circuitry 84, processor 86, radio interface 82, etc. The example method includes receiving (Block S138), such as via measurement unit 34 in processing circuitry 84 and/or radio interface 82, a configuration of a first measurement gap pattern and a second measurement gap pattern; and if at least one measurement gap within the first measurement gap pattern at least partially overlaps with at least one measurement gap within the second measurement gap pattern: discarding (Block S140), such as via measurement unit 34 in processing circuitry 84 and/or radio interface 82, the at least one measurement gap within the first measurement gap pattern; and performing, such as via measurement unit 34 in processing circuitry 84 and/or radio interface 82, positioning measurements during at least one measurement period according to the second measurement gap pattern.

In some embodiments, the performing the positioning measurements further comprises: performing, such as via measurement unit 34 in processing circuitry 84 and/or radio interface 82, reference signal time difference, RSTD, measurements during the at least one measurement period according to the second measurement gap pattern. In some embodiments, the performing the positioning measurements further comprises: performing, such as via measurement unit 34 in processing circuitry 84 and/or radio interface 82, the positioning measurements based on dense position reference signaling, PRS during the at least one measurement period according to the second measurement gap pattern. In some embodiments, the method further comprises adapting, such as via measurement unit 34 in processing circuitry 84 and/or radio interface 82, a measurement requirement associated with the second measurement gap pattern based on a relation between at least one parameter of the second measurement gap pattern and at least one parameter of the first measurement gap pattern. In some embodiments, the second measurement gap pattern is different from the first measurement gap pattern.

In some embodiments, the second measurement gap pattern is configured to support the positioning measurements and the first measurement gap pattern is configured to support mobility measurements. In some embodiments, the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements. In some embodiments, the discarding the at least one measurement gap within the first measurement gap pattern further comprises: leaving unused, such as via measurement unit 34 in processing circuitry 84 and/or radio interface 82, at least an amount of the at least one measurement gap for performing measurements for which the first measurement gap pattern is configured.

In some embodiments, the at least one measurement gap within the second measurement gap pattern is larger than the at least one measurement gap within the first measurement gap pattern. In some embodiments, the receiving the configuration further comprises: receiving, such as via measurement unit 34 in processing circuitry 84 and/or radio interface 82, the configuration of the second measurement gap pattern as a result of a request from the WD 22 to perform reference signal time difference, RSTD, measurements. In some embodiments, the performing the positioning measurements during the at least one measurement period according to the second measurement gap pattern further comprises: adapting, such as via measurement unit 34 in processing circuitry 84 and/or radio interface 82, a duration of the at least one measurement gap within the second measurement gap pattern based on a coverage enhancement, CE, level of the WD 22; and performing, such as via measurement unit 34 in processing circuitry 84 and/or radio interface 82, the positioning measurements according to the adapted duration.

In some embodiments, the performing the positioning measurements during at least one measurement period according to the second measurement gap pattern further comprises: adapting, such as via measurement unit 34 in processing circuitry 84 and/or radio interface 82, a duration of the at least one measurement gap within the second measurement gap pattern based on at least one of: an amount of overlap between the at least one measurement gap within the first measurement gap pattern and the at least one measurement gap within the second measurement gap pattern; a speed of the WD 22; a coverage enhancement level of a reference cell; a characteristic of reference signals used for measurements using the first measurement gap pattern and the second measurement gap pattern; and an indication from a network node 15; and performing the positioning measurements according to the adapted duration.

In another embodiment, the process includes receiving, via the radio interface 82 and from the network node 16, first and second measurement gap patterns. The process also includes performing, via the measurement unit 34, measurements according to the first and second measurement gap patterns.

In some embodiments, a WD 22 may be configured with a first measurement gap pattern (MGP1) (e.g., gap pattern #0 or any from Table 1 herein above) and may be configured with a second measurement gap pattern (MGP2) (e.g., the pattern defined for dense PRS) in parallel at the same time. The MGP1 may be characterized by or defined by one or more first measurement gaps (MG1) with a first measurement gap length (MGL1), a first measurement gap offset (GO1) and a first measurement gap repetition period (MGRP1). The MGP2 may be characterized by or defined by one or more second measurement gaps (MG2) with a second measurement gap length (MGL2), a second measurement gap offset (GO2) and a second measurement gap repetition period (MGRP2). In one embodiment, it may be assumed or determined that MG1 and MG2 at least partially overlap in time. In some embodiments, MGL1 and MGL2 are related by a relation. As an example, MGL2>MGL1. For example, MGP2 may be of length=40 subframes while MGL1 may be of length=6 subframes. In another example MGP2 may be of length=14 subframes while MGL1 may be of length=6 subframes. An example of a set of MGP1 and MPG2 whose MG1 and MG2 respectively fully overlap (MGP1 time resources are fully included in MGP2 time resources) in time and where MGL2>MGL1 is shown in FIG. 13, graph A compared to graph B.

In another example, MG1 and MG2 of MGL1 and MGL2 respectively may only partially overlap with respect to each as shown in FIG. 13, graph A compared to graph C. The overlapping part of the measurement gap is of AMG duration.

The embodiments are described for two measurement gap patterns configured in parallel. However, the embodiments are also applicable for the case when the same WD 22 is configured with any number of measurement gap patterns, e.g., with more than 2 measurement gap patterns, with 3 gap patterns, etc.

The first and the second measurement gap patterns may be configured by a first network node 16 (e.g., a radio network node (such as eNodeB or NR NodeB serving the WD 22). In one example, the second measurement gap pattern is configured by the first network node 16 upon receiving an indication or request from the WD 22 on the need of measurement gaps for performing RSTD measurements, where the indication/request may be transmitted by the WD 22 via RRC, e.g., in InterFreqRSTDMeasurementIndication which may include at least the frequency information and the measured PRS offset. The WD 22 may be able to support dense PRS in order to be configured with the second measurement gap pattern, e.g., the WD 22 may indicate such an ability to a second network node 16 (positioning node or E-SMLC) via LPP in densePrsConfig-r14. The WD 22 may be configured to perform the first radio measurements M1 based on signals (e.g., DRS or CRS) transmitted from at least one of the first network node 16 and neighbor radio network nodes. The WD 22 may be further configured to perform the second radio measurements M2 based on signals (e.g., dense PRS) transmitted by at least one of the first radio network node 16 and neighbor radio network nodes.

The WD 22 may require measurement gaps for performing measurements, e.g., when the signals to be measured are not available within the WD 22 measurement bandwidth or WD 22 radio frequency (RF) bandwidth. The need for measurement gaps can be determined based on the relation between the WD 22 RF bandwidth and the cell RF bandwidth (the bandwidth over which the measured signals are transmitted). The WD 22 bandwidth is typically known to the WD 22 since it is related to the WD 22 RF architecture or WD 22 category. For example, WD 22 category M1 is capable of bandwidth (BW)=1.4 MHz, WD 22 category M2 is capable of BW=5 MHz and WD 22 categories NB1 and NB2 are capable of BW=1 resource block (RB), e.g., 180 KHz etc. The cell (measured) bandwidth is typically broadcasted. Whether the WD 22 may require measurement gaps for performing certain measurements may also depend on the WD 22 architecture, e.g., the number of receiver chains. It may also depend on the type of measurements the WD 22 is configured to perform and/or report, the number of such measurements, etc. For example, if the WD 22 may not be configured to perform any neighbor cell RRM measurements, then the WD 22 may not need the first measurement gap, depending on the WD 22 bandwidth.

The WD 22 can be configured to perform different types of measurements using MGP1 and MGP2 on signals operated by cells on the same carrier frequency or on signals operated by cells on different carrier frequencies. Therefore, there can be several examples of scenarios with respect to the relationship between the frequencies of measurements done using MGP1 and MGP2 as described below, which provide some non-limiting examples:

Scenario 1: when the WD 22 is:
configured with first measurements (M1) that may require measurement gaps (MGP1) on one or more first carrier frequencies F1, and
configured with second measurements (M2) that may require measurement gaps (MGP2) on one or more second carrier frequencies F2, and
configured with MGP1 intended for first measurements (e.g., intra-frequency, inter-frequency, and/or inter-RAT measurements based on gaps), and
configured with a second measurement gap pattern (MGP2) that may be needed for second measurements.
Scenario 1a: the sets of F1 and F2 do not overlap.
Scenario 1b: the sets of F1 and F2 overlap partly.
Scenario 1c: the sets of F1 and F2 are the same.

In all the above, the WD 22 may be configured with the first and second measurement gaps at the same time (e.g., in the same message) or at different times (in different messages). In one specific example, the WD 22 is configured with MGP1 and has been using MGP1 before being configured with MGP2. In another example, MGP1 can be configured for periodic measurements for operational tasks while MGP2 may be configured only when the WD 22 is configured with positioning measurements, e.g., by the positioning node via LPP or similar protocol. But in all these examples, MG1 and MG2 at least partially overlap in time.

The first measurements are performed during the total measurement period T1 in time resources R1. When the first measurements (M1) require measurement gaps, it may be assumed that MGP1 time resources include at least R1. The second measurements (M2) are performed during the total measurement period T2 in time resources R2. When the second measurements may require measurement gaps, it may be assumed that MGP2 time resources include at least R2. The measurement M1 is interchangeably referred to as a first type of measurements and M2 is interchangeably referred to as a second type of measurements. The M1 and M2 are performed over a first type of discovery signals (DRS1) and over a second type of discovery signals (DRS2). Examples of DRS1 and DRS2 are CRS and PRS, respectively. Another set of examples of DRS1 and DRS2 are PSS/SSS and PRS, respectively. Examples of measurements performed using DRS1 are RSRP, RSRQ, RS-SINR, etc. Examples of measurements performed using DRS2 are RSTD or any measurement based on dense PRS, etc.

The coverage enhancement (CE) level of the WD 22 is also interchangeably referred to as a coverage level of the WD 22. The CE level can be expressed in terms of, for example:
received signal quality and/or received signal strength at the WD 22 with respect to a cell; and/or
received signal quality and/or received signal strength at a cell with respect to the WD 22.

The CE level of the WD 22 may be defined with respect to any cell such as serving cell, a neighbor cell, a reference cell, etc. For example, the CE level can be expressed in terms of received signal quality and/or received signal strength at the WD 22 with respect to a target cell on which it performs one or more radio measurements. Examples of signal quality are SNR, SINR, CQI, NRSRQ, RSRQ, CRS Ês/Iot, SCH Ês/Iot, etc. Examples of signal strength are path loss, RSRP, NRSRP, SCH RP etc. The notation Ês/Iot is defined as ratio of:

Ês, which is the received energy per RE (power normalized to the subcarrier spacing) during the useful part of the symbol, i.e., excluding the cyclic prefix, at the WD 22 antenna connector, to Iot, which is the received power spectral density of the total noise and interference for a certain resource element (RE) (power integrated over the RE and normalized to the subcarrier spacing) as measured at the WD 22 antenna connector.

The CE level can be expressed in at least two different levels. Consider an example of two different CE levels defined with respect to signal quality (e.g., SNR), at the WD 22, such as, for example:

Coverage enhancement level 1 (CE1) including SNR≥−6 dB at WD 22 with respect to its serving cell; and
Coverage enhancement level 2 (CE2) including −15 dB≤SNR<−6 dB at WD 22 with respect to its serving cell.

In the above example, the CE1 may also be interchangeably referred to as a normal coverage level (NCL), baseline coverage level, reference coverage level, basic coverage level, legacy coverage level, etc. On the other hand, CE2 may be referred to as enhanced coverage level or extended coverage level (ECL).

In another example, two different coverage levels (e.g., normal coverage and enhanced coverage) may be defined in terms of signal quality levels as follows:

The requirements for normal coverage are applicable for the WD 22 category NB1 with respect to a cell provided that, in one or more embodiments, radio conditions of the WD 22 with respect to that cell are defined as follows SCH Ês/Iot≥−6 dB and CRS Ês/Iot≥−6.

The requirements for enhanced coverage are applicable for the WD 22 category NB1 with respect to a cell provided that, in one or more embodiments, radio conditions of the WD 22 with respect to that cell are defined as follows SCH Ês/Iot≥−15 dB and CRS Ês/Iot≥−15.

A parameter defining coverage level of the WD 22 with respect to a cell may also be signaled to the WD 22 by the network node 16. Examples of such parameters are CE Mode A and CE Mode B signaled to the WD 22 category M1, WD 22 category M2 etc. The WD 22 configured with CE Mode A and CE Mode B are referred to as operating in normal coverage and enhanced coverage, respectively. For example:

The requirements for CE Mode A may apply provided that, in one or more embodiments, the WD 22 category M1 or WD 22 category M2 is configured with CE Mode A, SCH Ês/Iot≥−6 dB and CRS Ês/Iot≥−6 dB.

The requirements for CE Mode B may apply provided that, in one or more embodiments, the WD 22 category M1 or WD 22 category M2 is configured with CE Mode B, SCH Ês/Iot≥−15 dB and CRS Ês/Iot≥−15 dB.

The WD 22 may also determine the CE level with respect to a cell (e.g., cell1, cell2, etc.) during the random access transmission procedure to that cell. For example, the WD 22 may select the random access transmission resources (e.g. repetition level of random access (RA) channels) which are associated with different CE levels (e.g., physical random access channel (PRACH) CE level 0, CE level 1, CE level 2 etc) based on the received signal level (e.g. RSRP, NRSRP etc). The WD 22 may select or determine the CE level (e.g. PRACH CE level) based on the signal measurement results performed by the WD 22 (e.g. RSRP, NRSRP).

In general, in a larger CE level, the WD 22 may be capable of operating under a received signal level (e.g., RSRP, path loss, SNR, SINR, Ês/Iot, RSRQ etc) which is lower than the received signal level in a smaller CE level. The embodiments are applicable for any number of CE levels of the WD 22 with respect to a cell, e.g., CE1, CE2, CE3, CE4, etc. In this example, CE1 corresponds to smallest CE level while CE2 corresponds to larger CE level with respect to CE1 but smaller with respect to CE3 and CE3 corresponds to larger CE level with respect to CE2 but smaller with respect to CE4, and so on.

In one embodiment, the WD 22 is configured with MGP1 for performing the first measurement type (first measurements (M1) e.g., mobility measurements such as RSRP/RSRQ) and MGP2 for performing the second measurement type (second measurements (M2), e.g., positioning measurements) and may adapt the duration of MG1 and/or MG2 for doing M1 and M2 measurements, respectively. One aspect of this embodiment is that the WD 22 adapts the duration of MG1 and/or MG2 which is actually used by the WD 22 performing measurements M1 and M2 when MG1 and MG2 at least partly overlap with each other. The adapted values of MG1 and MG2 are called herein as MG1' and MG2' where MG1'<MG and MG2'<MG2.

The adaptation of MG1 to MG1' may impact at least one measurement requirement of M1. Also, the adaptation of MG2 to MG2' may impact at least one measurement requirement of M2. Examples of one or more measurement requirements are measurement time or period, measurement accuracy, number of cells on which the measurement is done over a measurement time, rate or percentage of dropping or discarding the measurement gap, etc. Examples of measurement time may include cell identification period or delay, measurement period or delay, measurement reporting period or delay, evaluation time, etc. Compared to MG1 and MG2, the corresponding adapted values MG1' and MG2' result in less available time for the WD 22 to perform M1 and M2 measurements. For example, it is assumed that the measurement periods of M1 and M2 when using MGP1 and MGP2 where MG1 and MG2 do not overlap are T1 and T2 respectively. These requirements (T1 and T2) are considered herein as references values. For example, the WD 22 can perform measurement M1 over T1 using MGP1 when MGP2 is not configured. Similarly the WD 22 can perform measurement M2 over T2 using MGP2 when MGP1 is not configured. But if both MGP1 and MGP2 are configured in parallel and MG1 and MG2 at least partly overlap then, as an example, the WD 22 may perform measurements M1 and M2 over an adapted first measurement time (T1') and an adapted second measurement time (T2') respectively. Where T1>T1' and T2>T2'. The adapted measurement time is longer than the unadapted measurement time for the same type of measurement because the available MG (MG') in the adapted case is shorter than the available MG in the unadapted case.

T2' and T1' and their relation to T2 and T1, respectively, may depend on the amount of overlap in frequency of the sets F1 and F2, e.g., the smaller the overlap, the larger the difference between the adapted and non-adapted period. In a special case, when F1 and F2 overlap in frequency, there may be no adaptation if the WD 22 is using a measurement gap pattern which is the union of both MGP1 and MGP2, otherwise at least one of measurement periods for M1 and M2 needs to be adapted.

Table 2 provides a general example of adaptation of measurement requirements for measurements M1 and M2 when MG1 and MG2 of MGP1 and MGP2 at least partly overlap in time (case 3 in table 2). In this case (case 3) the M1 and M2 are associated with requirements X3 and X4 respectively. In cases 1 and 2, only one of the gap patterns may be used at a time. This means requirement X3 is adapted and compared to X1 (X1 is reference value for M1) and also requirement X4 is adapted and compared to X2 (X2 is reference value for M2). Examples of X1, X2, X3 and X4 are for example measurement time as described above. The requirement X3 and X4 may further be expressed in terms of the amount of gap which is not used for the measurement e.g. percentage of gap which is discarded (e.g. part of MG1 is not used for M1) and instead used for the other measurement (e.g. for M2). Specific examples of X1 and X2 are measurement times of T1 and T2 corresponding to 400 ms and 1000 ms respectively. One set of specific examples of X3 and X4 are T1'=600 ms and T2'=1100 ms respectively, in which case both X3 and X4 are adapted. Another set of specific examples of X3 and X4 are T1'=400 ms and T2'=1400 ms respectively, in which case only X4 is adapted (i.e. T1'=T1).

Table 3 gives example of 4 different MGPs e.g. MGP ID #0, 1, 2 and 3. As an example, MGPs with ID #0 and 1 can be used for M1 measurements while MGPs with ID #2 and 3 can be used for M2 measurements.

Table 4 gives another example of adaptation of measurement requirements for measurements M1 and M2 when any combination of MGPs (MGP #0, 1, 2 and 3) are used for doing measurements M1 and M2 using gaps. Examples of cases 1, 2, 4, 6, 7 and 9 are reference cases, i.e., when the two gaps are not used in parallel at the same time. In cases 3, 5, 8 and 10 the WD 22 adapts the requirements with respect to the reference cases since the measurement gaps at least partly overlap in time.

TABLE 2

| Case | MGP configured for M1 measurements | MGP configured for M2 measurements | Measurement requirements for M1 | Measurement requirements for M2 |
|---|---|---|---|---|
| 1 | MGP1 | None | X1 | N/A |
| 2 | None | MGP2 | N/A | X2 |
| 3 | MGP1 | MGP2 | X3 | X4 |

TABLE 3

| | Measurement gap pattern | |
|---|---|---|
| MGP ID | Measurement gap length (MGL) | Measurement gap repetition period (MGRP) |
| 0 | 6 time resources | 40 time resources |
| 1 | 6 time resources | 80 time resources |
| 2 | 14 time resources | 40 time resources |
| 3 | 32 time resources | 80 time resources |

Note:
An example of time resources are subframes, slots etc.

TABLE 4

| Case | MGP configured for M1 measurements | MGP configured for M2 measurements | Measurement requirements for M1 | Measurement requirements for M2 |
|---|---|---|---|---|
| 1 | ID # 0 | None | X1 | N/A |
| 2 | None | ID # 2 | N/A | X2 |
| 3 | ID # 0 | ID # 2 | X3 | X4 |
| 4 | None | ID # 3 | N/A | X5 |
| 5 | ID # 0 | ID # 3 | X6 | X7 |
| 6 | ID # 1 | None | X8 | N/A |
| 7 | None | ID # 2 | N/A | X9 |
| 8 | ID # 1 | ID # 2 | X10 | X11 |
| 9 | None | ID # 3 | N/A | X12 |
| 10 | ID # 1 | ID # 3 | X13 | X14 |

As explained above, the adaptation of MG1 and MG2 to MG1' and MG2' may lead to adaptation of one or more measurement requirements. Further, the adaptation of MG1 and MG2 to MG1' and MG2', respectively, is based on one or more of the following criteria or conditions or parameters:

Relation between at least one parameter associated with MGP1 and at least one parameter associated with MGP1, e.g., difference between MGL1 and MGL2, amount of overlap between MG1 and MG2, etc.;

Coverage enhancement level of a reference cell, e.g., serving cell, measurement cell, etc.;

Indication received from a network node 16, e.g., the amount of MG1 and/or MG2 that should be adapted;

WD 22 speed, e.g., expressed in terms of Doppler frequency (e.g. in Hz), distance per unit time (e.g. km/hr); and Characteristics of DRS1 and/or DRS2, e.g., length of DRS1 and/or DRS2 in time or number of time resources of DRS1 and/or DRS2 in a measurement occasion. For example, if a number of subframes in a DRS2 occasion is above certain threshold (e.g. more than 30) then the WD 22 may be allowed to use at least 20% of the MG2.

The above criteria are explained with a few examples below.

In one example, the WD 22 can use at least part of MG2 belonging to MGP2 (or a function of it) for performing measurements M2 and entire part of MG1 certain time period T2 or T2' and then use MGP1 again (as per earlier configuration received prior to MGP2).

In one example, the WD 22 selects to use MGP2 only during time T2 or T2', e.g., the WD 22 can return back to MGP1, if MGP1 has been configured, after the second measurements are complete and/or reported.

Figure 14:
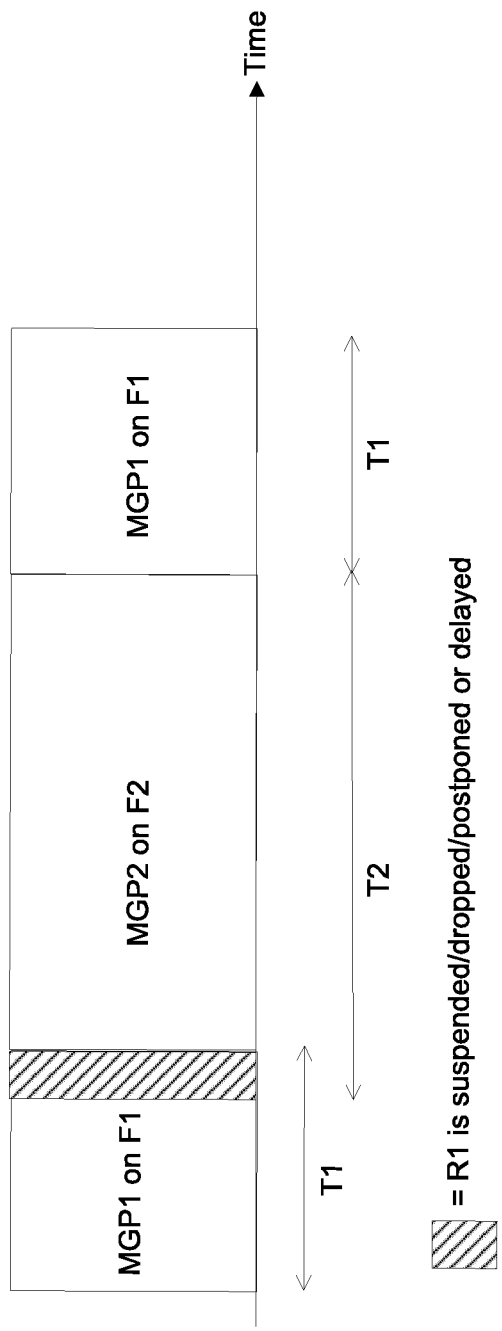
FIG. 14 is a diagram of one measurement scenario.

The WD 22 may not perform the first measurements during T2: The first measurements may be delayed/postponed/dropped until the end of T2 or paused resulting in that the measurement period T1 may be extended with T2 if the first measurements have started before the second measurements, e.g., in Scenario 1a or if the signals for the first measurements are not available during MGP2. This scenario is illustrated in FIG. 14.

The action performed by the WD 22 when MGP1 and MGP2 are on different frequencies and when MG1 and MG2 at least partly overlap in time (as described in the scenario), can also depend the coverage enhancement (CE) level difference of measured cells. Assuming that the first measurement is performed on cell1 using MGP1 on F1 and second measurement is performed on cell2 using MGP2 on F2, the coverage level for the WD 22 with respect to these cells are different. In a first example, if WD 22 is in enhanced coverage with respect to cell1, and normal coverage (e.g. CEModeA) or enhanced coverage (e.g. CEModeB) with respect to cell2, the WD 22 can be allowed to postpone or delay the resources belonging to MGP1 in favor of second measurement since the WD 22 is in enhanced coverage it is not likely to be very mobile and therefore postponing or delaying those measurements may not have adverse consequences.

In a second example, if cell1 is in normal coverage (e.g. CEModeA) and cell2 is in normal or enhanced coverage, and the configured gaps are on different frequencies and they overlap in time, the WD 22 can be allowed to drop the radio resources belonging to MG1 because typically WD 22s in normal coverage operate under higher velocities compared to normal coverage, and delaying or postponing those radio resources can be irrelevant when they are to be combined with previous samples for filtering of measurements.

In yet another example, the requirement, if MGP1 and MGP2 have at least partially overlapping measurement gaps in time, then the measurement requirements for M1 and/or M2 are adapted based on the coverage enhancement level of the WD 22 with respect to the reference cell (e.g. serving cell). For example, if the CE level of the WD 22 is normal coverage, then the WD 22 may be required to meet requirements defined in table 5, e.g., requirements Y3 and Y4 for M1 and M2 respectively. In another example, if the CE level of the WD 22 is enhanced coverage, then the WD 22 may be required to meet requirements defined in table 6, e.g., requirements Y3' and Y4' for M1 and M2, respectively.

TABLE 5

| Case | MGP configured for M1 measurements | MGP configured for M2 measurements | Measurement requirements for M1 | Measurement requirements for M2 |
|---|---|---|---|---|
| 1 | MGP1 | None | Y1 | N/A |
| 2 | None | MGP2 | N/A | Y2 |
| 3 | MGP1 | MGP2 | Y3 | Y4 |

TABLE 6

| Case | MGP configured for M1 measurements | MGP configured for M2 measurements | Measurement requirements for M1 | Measurement requirements for M2 |
|---|---|---|---|---|
| 1 | MGP1 | None | Y1' | N/A |
| 2 | None | MGP2 | N/A | Y2' |
| 3 | MGP1 | MGP2 | Y3' | Y4' |

In a third example, in a scenario similar to above examples, the WD 22 can be allowed to drop the radio resources belonging to MGP1 when WD 22 has received a high-speed indicator (e.g. highSpeedEnhancedMeasFlag) for the first cell. In this case, the network may explicitly inform the WD 22 about the high-speed operation, and in scenario, postponing or delaying a measurements can be irrelevant.

In yet another embodiment, it may be assumed that the MGL of MGP2 can depend on the coverage level of the WD 22 with respect to the measured signals of that cell. This means, the MGL can be longer in enhanced coverage compared to normal coverage, as illustrated in FIG. 15. In this example, the WD 22 can be allowed to drop or puncture (e.g., discard) the radio resources belonging to MGP2 in favor of first measurement on MGP1 because the WD 22 is in normal coverage in cell1 and therefore can more quickly carry out the first measurements, as compared to the second one. The measurement period for the second measurement is typically longer and therefore the WD 22 can still afford dropping few radio resources and then tune back to continue on the second measurements following MGP2. Likewise, whether the WD 22 is allowed to drop or puncture radio resources belonging to MGP2 can depend on the PRS periodicity and/or PRS occasions. For example, if the periodicity is short (i.e., gaps occur very frequently), then WD 22 can compensate for the dropped subframes in the next gap opportunity.

The WD 22 may perform the second measurements while performing the first measurements at least in some resources during T2 (if the signals for the first measurements are also available during MGP2): The first measurements are now performed based on MGP2 and not MGP1, either in resources R2 or in an intersection of the sets of resources R2 and R1.

In another example, the WD 22 generates a third measurement gap pattern MGP3 as a function MGP1 and MGP2 (e.g., a union over time resources of MGP1 and MGP2 or an intersection of time resources of MGP1 and MGP2) and uses MGP3 during T2, e.g., until the second measurements are complete while still performing the first measurements, as illustrated in FIG. 16.

The WD 22 may perform the second measurements while performing the first measurements at in some resources during T2: The first measurements may be performed in R1 or in a function of R2 and R1. The second measurements may be performed in R2 or in a function of R2 and R1.

In another example, the WD 22 may use MGP1 for the first measurements only and MGP2 for the second measurements only, when the measurement periods of M1 and M2 at least partly overlap in time. R1 and R2 may or may not overlap. The first measurements may be performed in R1 only, and the second measurements are performed in R2 only.

In a further embodiment, the WD 22 performs the first and the second measurements by frequencies based on the following one or more rules:

On carrier frequencies comprised in both F1 and F2, the WD 22 uses MGP2 during T2 or T2' to perform the first and the second measurements;

On carrier frequencies from F1 not comprised in F2, the WD 22 may still use MGP1 during T2 or T2' (i.e., during the second measurements on F2) to perform the first measurements, especially if R1 and R2 do not overlap; and On carrier frequencies from F2 not comprised in F1, the WD 22 uses MGP2 during T2 or T2' to perform the second measurements.

Figure 17:
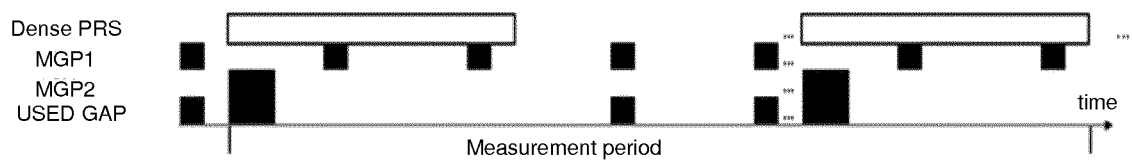
FIG. 17 is a diagram of measurement gaps according to one example.

In a further embodiment, if a measurement period T2 or T2' spans over two or more dense PRS positioning occasion, then the WD 22 may use MGP2 during positioning occasions with dense PRS, at least no carrier frequencies comprised in F2, but can still use MGP1 between the positioning occasions with dense PRS (see FIG. 17).

Figure 18:
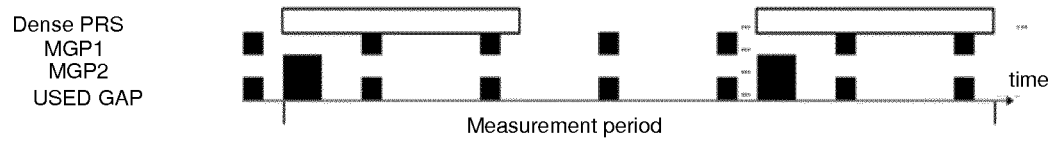
FIG. 18 is a diagram of measurement gaps according to another example.
Figure 19:
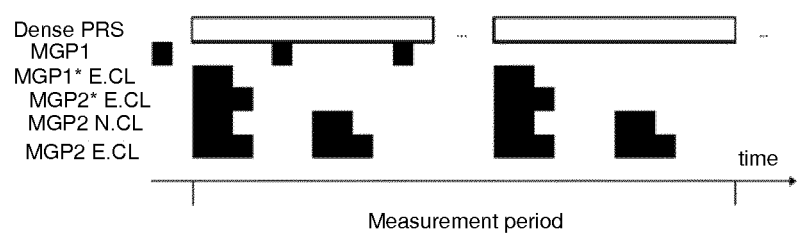
FIG. 19 is a diagram of a measurement gaps according to yet another example.

In FIG. 18, the WD 22 is using MGP1 and MGP2, i.e., the actually used measurement gaps are the union of MGP1 and MGP2.

Example rules may include one or more of the following:
MGP2 periodicity is such that there are no more than N gaps with MGP2 (N=1 is a special case, but more generally N can be >1) per positioning occasion;
No gaps based on MGP2 between positioning occasions with dense PRS;
MGP2 periodicity is not more frequent than dense PRS periodicity;
MGP2 length of a single gap is not longer than a dense PRS occasion;
MGP2 length of a single gap is longer for enhanced coverage level than for a normal coverage level or of same length in both coverage levels at least for a certain PRS configuration (comprising PRS occasion periodicity and occasion length). For example, the PRS occasion lengths that are smaller than a certain number N, the MGP2 length of a single gap can be same in both coverage levels. Otherwise, it can be longer for enhanced coverage, CE level 1.

According to some embodiments, a WD 22 configured with MGP1, may further be configured to perform one or more of the following:
determine MGP2* needed for second measurements;
indicate the determined MGP2* to a network node 16; and
in response to its indication, receive MGP2 from the network node 16.

In one example, upon receiving MGP2, some WD 22s may further also implement one or more embodiments described above.

In one embodiment, MGP2* includes a measurement gap pattern determined based on dense PRS configuration received from a network node 16 (e.g., from positioning node via LPP) for carrier frequencies F2.

In another embodiment, MGP2* includes a measurement gap pattern determined based on MGP1 and dense PRS configuration received from a network node 16 (e.g., from positioning node via LPP) for carrier frequency F2. For example, MGP2* may at least include MGP1 but also include additional time resources necessary for performing the second measurements. The additional resources may include all or some PRS subframes (not possible to measure with MGP1) comprised in the dense PRS configuration for the corresponding cell or carrier frequency. The additional resources may also be determined based on a coverage level, e.g., when the signal strength or quality is below a threshold MGP2* may include more additional resources, while otherwise MGP2* may comprise less additional resources.

Further example rules may include one or more of the following:
- MGP2* periodicity is such that there are no more than N gaps with MGP2 (N=1 is a special case, but more generally N can be >1) per positioning occasion;
- No gaps based on MGP2* between positioning occasions with dense PRS;
- MGP2* periodicity is not more frequent than dense PRS periodicity;
- MGP2* length of a single gap is not longer than a dense PRS occasion;
- MGP2* length of a single gap is longer for enhanced coverage level than for a normal coverage level or of same length in both coverage levels;
- MGP2 periodicity is the most frequent of MGP1 and MGP2*; and
- MGP2 length of a single gap is the longest between MGP2* length and MGP1 length.

According to one embodiment, the first network node 16 may receive an indication of MGP2* from the WD 22 or dense PRS configuration information for the second measurements configured in the WD 22 by the second network node 16.

The network node 16 may further configure MGP2 and signal to the WD 22, based on the received information and the rules described above.

The network node 16 may further determine the measurement period of first measurements and/or the second measurements, based on the configured MGP2, and use this information for one or more operational tasks. For example, if the measurement is not received over the determined measurement time period, the network node 16 may send another configuration message to the WD 22. Also, after the determined measurement period for M2, the network node 16 may send a de-configuration message for MGP2 or instruct the WD 22 to stop using the MGP2.

The network node 16 may further control the selective usage of MGP2 in the WD 22, e.g., trigger the using of an earlier configured MGP2, stop using, etc.

Some example embodiments include the following:

Embodiment A1. A network node configured to communicate with a wireless device (WD), the network node configured to, and/or comprising a radio interface and/or comprising processing circuitry configured to:
  determine a measurement period of at least first measurements based on a first measurement gap configuration; and
  perform at least one operational task based on the first measurement gap configuration.

Embodiment A2. The network node of Embodiment A1, wherein if a measurement is not received during the measurement period, the network node is further configured to send a configuration message to the WD.

Embodiment A3. The network node of Embodiment A1, wherein after the measurement period, the network node is further configured to send a de-configuration message to the WD.

Embodiment B1. A method implemented in a network node, the method comprising:
  determining a measurement period of at least first measurements based on a first measurement gap configuration; and performing at least one operational task based on the first measurement gap configuration.

Embodiment B2. The method of Embodiment B1, wherein if a measurement is not received during the measurement period, the method further includes sending a configuration message to the WD.

Embodiment B3. The method of Embodiment B1, wherein after the measurement period, the method further includes sending a de-configuration message to the WD.

Embodiment C1. A wireless device (WD) configured to communicate with a network node, the WD configured to, and/or comprising a radio interface and/or processing circuitry configured to:
  receive from the network node first and second measurement gap patterns; and
  perform measurements according to the first and second measurement gap patterns.

Embodiment C2. The WD of Embodiment C1, wherein the WD is further configured to send a request to the network node for the first and second measurement gap patterns.

Embodiment C3. The WD of Embodiment C1, wherein the WD is further configured to send an indication of an ability to support dense position reference signaling, PRS.

Embodiment D1. A method implemented in a wireless device (WD), the method comprising:
  receiving from the network node first and second measurement gap patterns; and
  performing measurements according to the first and second measurement gap patterns.

Embodiment D2. The method of Embodiment D1, wherein the WD is further configured to send a request to the network node for the first and second measurement gap patterns.

Embodiment D3. The method of Embodiment D1, wherein the WD is further configured to send an indication of an ability to support dense position reference signaling, PRS.

Embodiment E1. A network node, comprising:
  a memory module configured to store a measurement period
  a measurement period determination module configured to determine a measurement period of at least first measurements based on a first measurement gap configuration.

Embodiment E2. A wireless device, comprising:
  a memory module configured to store measurement gap patterns
  a measurement module configured to perform measurements according to first and second measurement gap patterns received from a network node.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising processing circuitry configured to:
   receive a configuration of a first measurement gap pattern and a second measurement gap pattern, the first measurement gap pattern having a first measurement gap length and being configured to support mobility measurements on a first type of signals, and the second measurement gap pattern having a second measurement gap length and being configured to support positioning measurements on a second type of signals; and
   if at least one measurement gap within the first measurement gap pattern at least partially overlaps with at least one measurement gap within the second measurement gap pattern:
      discard the at least one measurement gap within the first measurement gap pattern by one of:
         not using an amount of the at least one measurement gap for performing mobility measurements for which the first measurement gap pattern is configured; and
         suspending use of the at least one measurement gap for mobility measurements; and
      perform positioning measurements during at least one measurement period, the measurement period including the at least one discarded measurement gap of the first measurement gap pattern, according to the second measurement gap pattern.

2. The WD of claim 1, wherein the processing circuitry is configured to perform the positioning measurements by being configured to one of:
   perform reference signal time difference, RSTD, measurements during the at least one measurement period according to the second measurement gap pattern; and
   perform the positioning measurements based on dense position reference signaling, PRS, during the at least one measurement period according to the second measurement gap pattern.

3. The WD of claim 1, wherein the processing circuitry is further configured to:
   adapt a measurement requirement associated with the second measurement gap pattern based on a relation between at least one parameter of the second measurement gap pattern and at least one parameter of the first measurement gap pattern.

4. The WD of claim 1, wherein the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements.

5. The WD of claim 1, wherein the at least one measurement gap within the second measurement gap pattern is larger than the at least one measurement gap within the first measurement gap pattern.

6. The WD of claim 1, wherein the processing circuitry is further configured to perform the positioning measurements during the at least one measurement period according to the second measurement gap pattern by being configured to:
adapt a duration of the at least one measurement gap within the second measurement gap pattern based on a coverage enhancement, CE, level of the WD; and
perform the positioning measurements according to the adapted duration.

7. The WD of claim 1, wherein the processing circuitry is further configured to perform the positioning measurements during the at least one measurement period according to the second measurement gap pattern by being configured to:
adapt a duration of the at least one measurement gap within the second measurement gap pattern based on at least one of:
an amount of overlap between the at least one measurement gap within the first measurement gap pattern and the at least one measurement gap within the second measurement gap pattern;
a speed of the WD;
a coverage enhancement level of a reference cell;
a characteristic of reference signals used for measurements using the first measurement gap pattern and the second measurement gap pattern; and
an indication from the network node; and
perform the positioning measurements according to the adapted duration.

8. A method for a wireless device, WD, the method comprising:
receiving a configuration of a first measurement gap pattern and a second measurement gap pattern, the first measurement gap pattern having a first measurement gap length and being configured to support mobility measurements on a first type of signals, and the second measurement gap pattern having a second measurement gap length and being configured to support positioning measurements on a second type of signals; and
if at least one measurement gap within the first measurement gap pattern at least partially overlaps with at least one measurement gap within the second measurement gap pattern:
discarding the at least one measurement gap within the first measurement gap pattern by one of:
not using an amount of the at least one measurement gap for performing mobility measurements for which the first measurement gap pattern is configured; and
suspending use of the at least one measurement gap for mobility measurements; and
performing positioning measurements during at least one measurement period, the measurement period including the at least one discarded measurement gap of the first measurement gap pattern, according to the second measurement gap pattern.

9. The method of claim 8, wherein the performing the positioning measurements further comprises:
performing reference signal time difference, RSTD, measurements during the at least one measurement period according to the second measurement gap pattern.

10. The method of claim 8, wherein the performing the positioning measurements further comprises:
performing the positioning measurements based on dense position reference signaling, PRS during the at least one measurement period according to the second measurement gap pattern.

11. The method of claim 8, further comprising adapting a measurement requirement associated with the second measurement gap pattern based on a relation between at least one parameter of the second measurement gap pattern and at least one parameter of the first measurement gap pattern.

12. The method of claim 8, wherein the second measurement gap pattern is different from the first measurement gap pattern.

13. The method of claim 8, wherein the first measurement gap pattern is configured to support at least one of cell-specific reference signal, CRS, measurements, reference signal receiver power, RSRP, measurements, reference signal received quality, RSRQ, measurements, reference signal-signal-to-interference-plus-noise ratio, RS-SINR, measurements, and synchronization signal measurements.

14. The method of claim 8, wherein the at least one measurement gap within the second measurement gap pattern is larger than the at least one measurement gap within the first measurement gap pattern.

15. The method of claim 8, wherein the receiving the configuration further comprises:
receiving the configuration of the second measurement gap pattern as a result of a request from the WD to perform reference signal time difference, RSTD, measurements.

16. The method of claim 8, wherein the performing the positioning measurements during the at least one measurement period according to the second measurement gap pattern further comprises:
adapting a duration of the at least one measurement gap within the second measurement gap pattern based on a coverage enhancement, CE, level of the WD; and
performing the positioning measurements according to the adapted duration.

17. The method of claim 8, wherein the performing the positioning measurements during the at least one measurement period according to the second measurement gap pattern further comprises:
adapting a duration of the at least one measurement gap within the second measurement gap pattern based on at least one of:
an amount of overlap between the at least one measurement gap within the first measurement gap pattern and the at least one measurement gap within the second measurement gap pattern;
a speed of the WD;
a coverage enhancement level of a reference cell;
a characteristic of reference signals used for measurements using the first measurement gap pattern and the second measurement gap pattern; and
an indication from a network node; and
performing the positioning measurements according to the adapted duration.

18. A method for a network node configured to communicate with a wireless device, WD, the method comprising:
configuring the WD with a first measurement gap pattern and a second measurement gap pattern, the first measurement gap pattern having a first measurement gap length and being configured to support mobility measurements on a first type of signals, and the second measurement gap pattern having a second measurement gap length and being configured to support positioning measurements on a second type of signals;

receiving an indication of a positioning measurement from the WD, the positioning measurement configured to be performed during at least one measurement period according to the second measurement gap pattern, while discarding at least one measurement gap within the first measurement gap pattern if the at least one measurement gap within the first measurement gap pattern at least partially overlaps with at least one measurement gap within the second measurement gap pattern;

the discarding comprising one of:
not using an amount of the at least one measurement gap for performing mobility measurements for which the first measurement gap pattern is configured; and
suspending use of the at least one measurement gap for mobility measurements; and the at least one measurement period including the at least one discarded measurement gap of the first measurement gap pattern.

19. The method of claim 18, wherein the positioning measurement is at least one of a reference signal time difference, RSTD, measurement and a positioning measurement based on dense position reference signaling, PRS.

20. The method of claim 18, further comprising:
receiving a request from the WD to perform reference signal time difference, RSTD, measurements; and
configuring the WD with the second measurement gap pattern as a result of the request.

21. The method of claim 18, further comprising:
if a positioning measurement is not received during the at least one measurement period, sending a configuration message to the WD, the configuration message re-configuring the WD with the second measurement gap pattern.

22. The method of claim 18, further comprising:
as a result of receiving the indication of the positioning measurement from the WD, sending a de-configuration message to the WD, the de-configuration message instructing the WD to stop using the second measurement gap pattern.

\* \* \* \* \*